US 7,167,598 B2

(12) United States Patent
Vuylsteke

(10) Patent No.: US 7,167,598 B2
(45) Date of Patent: Jan. 23, 2007

(54) NOISE REDUCTION METHOD

(75) Inventor: Pieter Vuylsteke, Mortsel (BE)

(73) Assignee: Agfa-Gevaert N.V., Mortsel (BE)

( * ) Notice: Subject to any disclaimer, the term of this patent is extended or adjusted under 35 U.S.C. 154(b) by 815 days.

(21) Appl. No.: 10/331,207

(22) Filed: Dec. 30, 2002

(65) Prior Publication Data

US 2003/0161548 A1    Aug. 28, 2003

Related U.S. Application Data

(60) Provisional application No. 60/362,416, filed on Mar. 7, 2002.

(30) Foreign Application Priority Data

Feb. 22, 2002  (EP)  ................... 02100177

(51) Int. Cl.
  *G06K 9/40*    (2006.01)
(52) U.S. Cl. ...................... 382/274; 345/617
(58) Field of Classification Search ................ 382/302, 382/240, 274; 358/3.26; 345/617
  See application file for complete search history.

(56) References Cited

U.S. PATENT DOCUMENTS 6,463,181 B2 * 10/2002 Duarte ....................... 382/254
6,943,920 B2 *  9/2005 Edgar ....................... 358/3.26

FOREIGN PATENT DOCUMENTS

| EP | 0 527 525 A2 | 2/1993 |
| EP | 0 574 969 A2 | 12/1993 |
| EP | 0 971 316 A2 | 1/2000 |
| EP | 02 10 0177 | 7/2002 |

OTHER PUBLICATIONS

Cincotti et al., "Frequency Decomposition and Compounding of Ultrasound Medical Images with Wavelet Packets", IEEE Transactions on Medical Imaging, vol. 20, No. 8, pp. 764-771, Aug. 2001.
Fivez et al., "Multi-Resolution Contrast Amplification in Digital Radiography with Compensation for Scattered Radiation", Proceedings of the International Conference on Image Processing (ICIP), Sep. 16-19, 1996, pp. 339-342.
Reeves et al., "Multiscale-Based Image Enhancement", Electrical and Computer Engineering, 1997, Engineering Innovation: Voyage of Discovery, IEEE 1197 Canadian Conference on St. Johns, NFLD., Canada May 25-28, 1997, New York, NY, USA, IEEE, US , pp. 500-503.

* cited by examiner

*Primary Examiner*—Daniel Miriam
*Assistant Examiner*—Dennis Rosario
(74) *Attorney, Agent, or Firm*—Houston Eliseeva LLP

(57) ABSTRACT

A method of reducing noise in an image by decomposing the digital signal representation of the image into a sequence of detail images representing detail at successive scales and a residual image and modulating pixels of at least some of the detail images by applying modulating coefficients. The modulating coefficients are deduced from a single contrast-to-noise ratio image which represents the local contrast-to-noise ratio in each pixel at a predefined scale.

15 Claims, 11 Drawing Sheets

NOISE REDUCTION METHOD

This application claims the priority of provisional application No. 60/362,416 filed Mar. 7, 2002.

FIELD OF THE INVENTION

The present invention relates to image processing of digital medical images. The invention more particularly relates to a method of reducing noise in a medical image.

BACKGROUND OF THE INVENTION

Nowadays several medical image acquisition techniques exist that render a digital signal representation of a medical image, e.g. a radiographic image.

One example of such a system is a computed radiography system wherein a radiation image is recorded on a temporary storage medium, more particularly a photostimulable phosphor screen. In such a system a digital signal representation is obtained by scanning the screen with radiation of (a) wavelength(s) within the stimulating wavelength range of the phosphor and by detecting the light emitted by the phosphor upon stimulation.

Other examples of computed radiography systems are direct radiography systems, for example systems wherein a radiographic image is recorded in a solid state sensor comprising a radiation sensitive layer and a layer of electronic read out circuitry.

Still another example of a computed radiography system is a system wherein a radiographic image is recorded on a conventional x-ray film and wherein that film is developed and subsequently subjected to image scanning.

Still other systems such as a tomography system may be envisaged.

The digital image representation of the medical image acquired by one of the above systems can then be used for generating a visible image on which the diagnosis can be performed. For this purpose the digital signal representation is applied to a hard copy recorder or to a display device.

Commonly the digital signal representation of the image is subjected to image processing prior to hard copy recording or display.

In order to convert the digital image information optimally into a visible image on a medium on which the diagnosis is performed, a multi-resolution image processing method has been developed by means of which the contrast of an image is enhanced.

According to this multi-resolution image processing method an image represented by an array of pixel values is processed by applying the following steps. First the original image is decomposed into a sequence of detail images at multiple scales and a residual image.

Next, the pixel values of the detail images are modified by applying to these pixel values at least one non-linear monotonically increasing odd conversion function with a slope that gradually decreases with increasing argument values.

Finally, a processed image is computed by applying a reconstruction algorithm to the residual image and the modified detail images, the reconstruction algorithm being such that if it were applied to the residual image and the detail images without modification, then the original image or a close approximation thereof would be obtained.

Different embodiments of the above image processing technique has been described extensively in European patent EP 527 525, the processing being referred to as MUSICA image processing (MUSICA is a registered trade name of AGFA-GEVAERT N.V.).

The described method is advantageous over conventional image processing techniques such as unsharp masking etc. because it increases the visibility of subtle details in the image and because it increases the faithfulness of the image reproduction without introducing artefacts.

In order to reduce the noise level in a digital image a method has been applied as described in European patent application EP-A-574 969.

The digital image representation is decomposed into a set of detail images representing image detail at successive resolution levels and a residual image.

At least some of these detail images are then processed as follows. First the noise level in each detail image is estimated. Next a local observation neighbourhood is established around each pixel and the local variance is estimated within that neighbourhood.

Then, the detail images are pixelwise attenuated as a function of the image content and in accordance with the estimated noise level.

More particularly, the local variance is compared with the noise variance and a pixel is attenuated if the local variance approximates the noise variance. No attenuation is applied if the local variance is significantly larger than the noise variance.

In this method the attenuation is determined at a specific scale of the multi-resolution representation independent of the other scales. The noise level at the scale that is processed is taken as a reference.

This approach has the following drawback. In one and the same pixel the attenuation coefficients of successive scales can largely differ because the correlation between pixels at successive scales is limited and because the calculation of the attenuation is a non-linear operation.

This fact introduces additional noise having small magnitude but a rather artificial pattern.

It is an object of the present invention to provide a method that overcomes the above-described problems of the prior art.

SUMMARY OF THE INVENTION

To overcome the problems of the prior art the present invention provides a method as set out in the appending claims.

According to one aspect, the invention features a method of reducing noise in an image by processing a digital signal representation of the image. This processing comprises the steps of: 1) decomposing the digital signal representation into at least two detail images representing detail at successive scales; 2) modulating pixels of at least some of the detail images by applying modulating coefficients to the pixels so as to generate modified detail images (wherein the modulation is an attenuation of pixel values if a local contrast-to-noise ratio is smaller than a predefined critical contrast-to-noise ratio and wherein no modulation is applied if the local contrast-to-noise ratio is equal to or greater than the predefined critical contrast-to-noise ratio); and 3) computing a processed digital signal representation by applying a reconstruction algorithm to the modified detail images, wherein the modulating coefficients are deduced from a single contrast-to-noise ratio image which represents the local contrast-to-noise ratio in each pixel at a predefined one of the scales.

The embodiments of the methods of the present invention are generally implemented in the form of a computer program product adapted to carry out the method steps of the present invention when run on a computer. The computer program product is commonly stored in a computer readable carrier medium such as a CD-ROM. Alternatively the computer program product takes the form of an electric signal and can be communicated to a user through electronic communication.

DETAILED DESCRIPTION OF THE INVENTION

Description of an Image Acquisition System

Figure 1:
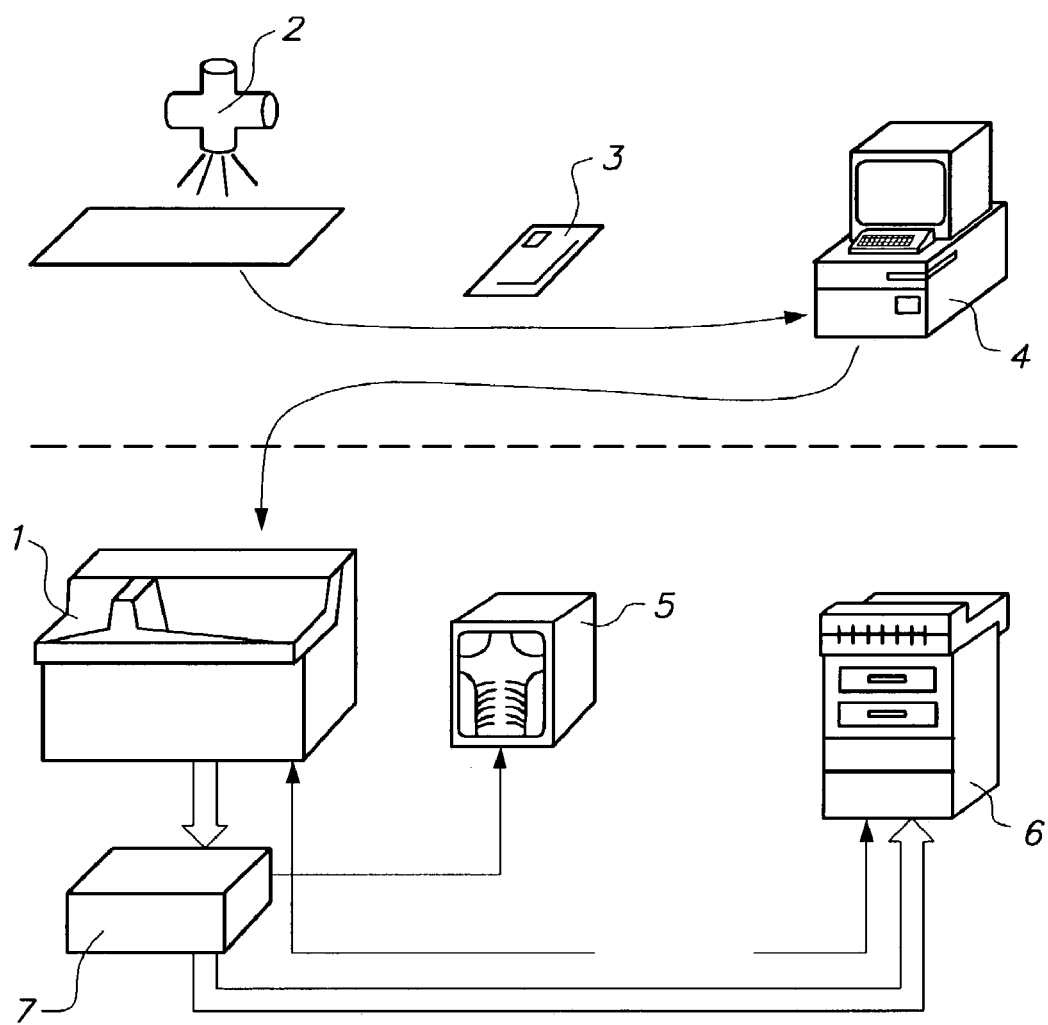
FIG. 1 shows an apparatus for acquisition of a digital signal representation of a medical image, for processing the digital representation and for generating an enhanced visible image.

X-rays emitted by a source of radiation (2) are transmitted by a patient (not shown) and recorded on a temporary storage medium, is more particularly a photostimulable phosphor screen (3). In an identification station (4) patient identification data are written into a memory device, e.g. an EEPROM provided on a cassette carrying the photostimulable phosphor screen.

The exposed photostimulable phosphor screen is then fed into a read out apparatus (1) where a digital signal representation of the stored radiation image is generated.

For this purpose the exposed screen is scanned by means of radiation having (a) wavelength(s) within the stimulation wavelength range of the photostimulable phosphor. Imagewise modulated light is emitted by the phosphor upon stimulation. This light is detected and converted by an opto-electronic converter and subsequent A-to-D converter into a digital signal representation of the radiation image.

The digital signal representation is applied to an image-processing module (7), which can be incorporated in the read out device or provided as a separate unit. In the image-processing module the digital signal representation is subjected to different kinds of processing, among which are multi-resolution contrast enhancement, noise reduction and gradation processing.

Finally the processed digital image representation is applied to an output apparatus such as a hard copy recording device (6) or a display monitor (5) where a visible image is generated.

The visible image can be used by the radiologist for making a diagnosis.

Image Chain

By means of the terms 'image chain' is meant the sequence of image operations and image processing control mechanisms that are applied either separately or in combination to the signal representation of the image for transforming the signal generated by the read out device into a processed digital signal representation that can be applied to the output device.

Figure 2:
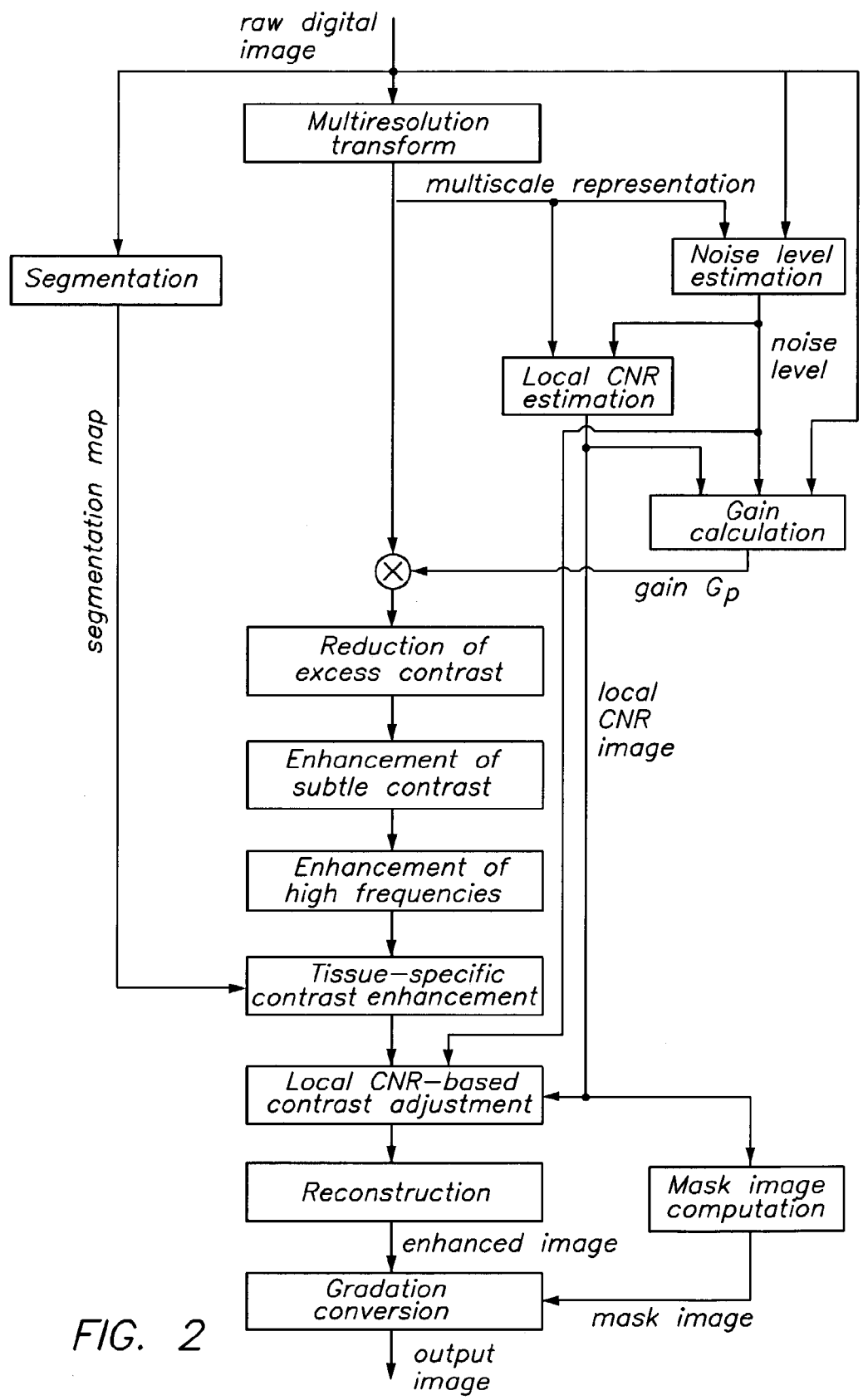
FIG. 2 is a block scheme illustrating the image chain.

A block diagram illustrating the entire image chain is illustrated in FIG. 2.

The image chain comprises the steps enumerated below. Each of the steps will be described extensively in the following.

In a preliminary step the digital signal representation of an image is subjected to a conversion according to a square root function, in order to make the pixel values proportional to the square root of the radiation dose recorded on the photostimulable phosphor screen. The resulting image is called a raw digital image.

One of the main sources of noise in the image is quantum mottle, which has a Poisson distribution. The square root conversion ensures that the noise statistics is transformed into a Gaussian distribution, with a standard deviation that is independent of dose. The latter pre-processing of the digital image is not essential, but it greatly simplifies the mathematics of the subsequent processing stages, because the noise can then be assumed roughly uniform across the raw image.

In an alternative embodiment, the square root conversion is carried out in the read out apparatus by means of an amplifier with square root characteristic. A raw digital image is generated by applying A-to-D conversion to the resulting signal.

With both embodiments, the raw digital image is used for further processing.

In a first processing step the raw digital image is decomposed into at least two detail images at successive scales and a residual image (further referred to as multiscale representation), according to a multi-resolution transform.

From the multiscale representation and/or the raw digital image a number of values such as noise level, gain factor, local contrast to noise ratio (CNR) estimations are derived. These values will be used in the following steps.

In the next step the multi-scale representation is subjected to a normalisation procedure to cancel out disturbing fluctuations which are due to dose variations, different exposure parameters, different patient latitude etc.

This is followed by a reduction of excess contrast in the image. This step comprises a limitation of the signal range by applying a conversion function that consists of a linear and an exponential part.

The reproduction of subtle details is enhanced by means of an amplifying component that is superposed on the function for limiting the signal range.

In the following processing step the small-scale edges and textures are rendered by controlling the contrast enhancement of details as a function of the scale in the multi-scale representation.

Next the image is subjected to a tissue-specific contrast enhancement. This enhancement step makes use of a segmentation map derived from the raw image.

In the subsequent step the pixels of the multi-scale representation are locally attenuated or amplified depending upon local contrast-to-noise ratio, which quantity discriminates between homogeneous and non-homogeneous image regions.

Next the processed multi-scale representation is subjected to a reconstruction step by applying the inverse of the decomposition transform to the modified detail images.

Finally the reconstructed image is subjected to gradation processing and the pixel values are converted into driving values for the hard- or softcopy reproducing device.

The processing applied to the signal representation of the radiation image comprises a multi-resolution contrast enhancement. The image is first decomposed into a weighted sum of basis image components at several scales by applying a decomposition transform. The components of the multi-resolution representation are referred to as detail images. The pixel values of the multi-resolution representation correspond with the contrast of elementary image components, relative to their close neighbourhood.

This multi-resolution decomposition step is followed by an image enhancement step wherein the pixel values of the multi-resolution representation are amplified or weakened in order to obtain the envisaged contrast enhancement.

In the next step the modified components are re-combined into a grey value image by applying the inverse of the decomposition transform.

The multi-resolution decomposition can be performed before the normalisation step as set out in FIG. 2. Alternatively it can be performed simultaneously with or after normalisation.

The successive operations applied to the layers of the normalised multiscale representation can be considered as a sequence of concatenated operations, i.e. the input of one operation is the output of the previous operation.

The contrast enhancing steps shown in FIG. 2 can be performed in combination. Alternatively individual contrast enhancing steps can be left out (this will however have a consequence on the overall image quality).

1. Multi-resolution Transform

The raw digital image is subjected to a multi-resolution decomposition. The image is decomposed into at least two detail images representing detail at several successive scales.

This technique has been described extensively in EP 527 525.

The pixels of the detail images represent the amount of variation of pixel values of the original image at the scale of the detail image, whereby scale refers to spatial extent of these variations.

A residual image can also be generated which is an approximation of the original image with omission of all variations comprised in the detail images.

The detail images at subsequent scales (or resolution levels) are called multi-scale layers, or simply layers.

In one example the detail images at successively coarser resolution levels (scales) are obtained as the result of each of k iterations of the following steps:

a) computing an approximation image at a next coarser level by applying a low pass filter to the approximation image corresponding to the current iteration, and subsampling the result in proportion to the reduction in spatial frequency bandwidth, using however the original image as input to said low pass filter in the course of the first iteration;

b) computing a detail image as the pixelwise difference between the approximation image corresponding to the current iteration and the approximation image at a next coarser resolution level computed according the method sub (a), both images being brought into register by proper interpolation of the latter image; wherein the residual image is equal to the approximation image produced by the last iteration.

A reconstructed image can be computed by applying the inverse transform. In the described embodiment a reconstructed image can be computed by iterating k times the following procedure starting from the coarsest detail image and the residual image:

computing the approximation image at the current resolution level by pixelwise adding the detail image at the same resolution level to the approximation image at the coarser resolution level corresponding to the previous iteration, both images being brought into register by proper interpolation of the latter image, using however the residual image instead of said coarser approximation image in the course of the first iteration.

The residual image will be a low-resolution image or in the extreme case, an image comprising only one single pixel, depending on the number of iterations in the decomposition.

The latter combination of forward and inverse multi-resolution transform is commonly known as the Burt pyramid transform.

In an alternative embodiment the image is decomposed into a weighted sum of predetermined basic detail images at multiple resolution levels and occasionally a residual basic image by applying a transform to the image, the transform yielding a set of detail coefficients each expressing the relative contribution to the original image of one of a set of basis functions representing these basic detail images and occasionally a residual coefficient representing the relative contribution to the original image of a basis function representing the basic residual image.

The basis functions are continuous and non-periodic and have zero mean value except for the basis function that represents the basic residual image. An example of such basis functions are wavelets.

The transform is such that there exists an inverse transform which returns the original image or a close approximation thereof when being applied to the transform coefficients.

The image can be reconstructed by applying the inverse transform to the detail coefficients and the residual coefficient if generated.

2. Estimating the Noise Level.

In one embodiment the noise level in the image is estimated on the basis of a single layer of the multiscale representation of the raw digital image at a predetermined scale. Scale zero is preferred because the relative contribution of the noise in that layer is greater than in the larger scale layers, and hence the estimation of the noise level is less influenced by the presence of image details such as edges, spots and textures.

In a first step of estimating the noise level an image is computed that represents the local standard deviation at the predefined scale, i.e. at the finest scale.

The image of local standard deviation at a predefined scale is derived from the corresponding layer of the multiscale representation. The pixel values of the specified layer represent the deviation of the local average grey value at that scale relative to its corresponding value at the next larger scale. In each pixel of the specified layer a square window of N pixel values $a_i$, centred around the current pixel is taken, and the local standard deviation sdev at current pixel position is computed by taking the square root of the window average of the squared pixel values:

$$sdev = \sqrt{\frac{\sum_{i=1}^{N}(a_i)^2}{N}}$$

From the resulting image the histogram of local standard deviation is derived.

The histogram of an image is an array consisting of a predefined number of bins. Each bin is associated with a specific pixel value interval or single pixel value, in such a way that the entire pixel value range is covered by all subsequent bins. After computation of the histogram each bin represents the absolute or relative number of pixels in the image that have a pixel value within the interval associated with the bin. The histogram is computed as follows. Initially all bins are set to zero count. Next for each image pixel, it is determined to which predefined interval the pixel value belongs, and the corresponding bin is incremented by one.

The histogram of local standard deviation is restricted to those pixels that have a grey value within a subrange of the actual grey value range. This means that for each pixel of the image of local standard deviation, the corresponding histogram bin is incremented only if the corresponding pixel in the grey value image is within specified subrange. If rmin and rmax are the minimum and maximum grey values respectively of the digital image, then this subrange is defined as: [rmin+margin/(rmax−rmin), rmax−margin/(rmax−rmin)]. Typically, margin is 3%. By restricting the histogram of local standard deviation to pixels with grey value within the latter subrange, one will avoid cluttering of the histogram by pixels of saturated image regions due to wrong exposure setting or other image artefacts.

The histogram of local standard deviation has a very much pronounced peak approximately centred at the noise level. The noise level is defined as the centre of this peak. Alternatively, it can be defined as the local standard deviation value that corresponds to the point where the histogram is maximum, or the median value restricted to the dominant peak of the histogram.

3. Automatic Calculation of the Amplification Factor and Normalisation of the Signal Level.

The pixel values of the digital raw image are proportional to the square root of the radiation dose recorded on the photostimulable phosphor screen. This relation is expressed by the following formula:

$$r = \sqrt{Ga \cdot x}$$

wherein r represents a raw pixel value, x represents a radiation dose value absorbed by the photostimulable phosphor screen and Ga is the global amplification factor of the image acquisition system.

The average signal level varies from one image to another mainly due to the following factors: radiation dose variations, change of exposure parameters from one exposure to another, attenuation differences related to patient stature, sensitivity change of the read out system.

With regard to the diagnosis, the original signal level is not that relevant. However, the enumerated fluctuations are disturbing the image processing chain.

To avoid the disturbing effect of radiation dose fluctuations on the operation of the image processing chain the raw digital image has to be normalised in a multiplicative way.

$$t = r \cdot Gp$$

wherein t is a normalised pixel value and Gp is a normalisation factor.

A multiplicative correction is equivalent with a change of the read out sensitivity. In case of over or under-exposure, this kind of normalisation provides that the image signal is mapped onto a standard signal range.

Nevertheless the end result of this operation is not identical to the result one would get with a correct exposure since by the normalisation operation noise present in the image signal is equally amplified with the signal (whereas increasing the dose would result in an improved signal-to-noise ratio).

The normalisation factor Gp can be deduced from characteristics of the raw digital image. For computational reasons however, it is preferred to derive the normalisation factor not directly from the raw digital image, but from its multiscale representation instead. Once the normalisation factor is determined, it is preferred to apply it immediately to the pixels of the multiscale representation, since the further processing stages are based on the normalised multiscale representation instead of the normalised raw digital image. For that purpose, all layers of the multiscale representation and the residual image are pixelwise multiplied by the normalisation factor Gp. In an alternative embodiment, a first multiscale decomposition is applied to the raw digital image, the result of which is used only for determining the normalisation factor Gp, next this normalisation is applied to the raw digital image, and a second multiscale decomposition is applied to the normalised raw digital image. The resulting normalised multiscale representation of the raw digital image is identical in both embodiments, and it is used as a basis for further processing.

In this embodiment the normalisation factor Gp is deduced from the multiscale representation of the raw digital image as will be shown hereafter.

Four criteria have been evaluated and can be applied, each having a number of advantages:
  first criterion: constant signal level
  second criterion: constant noise level
  third criterion: constant contrast
  fourth criterion: preferred embodiment a) First Criterion: Constant Signal Level According to this criterion a representative grey value is searched for in the histogram of grey values of pixels of the raw digital image.

This representative grey value is mapped onto a constant reference level $T_r$.

The normalisation factor Gl is then equal to $T_r/r_l$ wherein $r_l$ is the representative grey value in the histogram.

This representative grey value is determined as follows:

First a grey value histogram of the raw digital image is calculated restricted to those pixels that have a local contrast-to-noise ratio (CNR) between fixed margins, typically between 2 and 10. The local CNR is represented by a local CNR image, that has the same dimensions as the grey value image from which the histogram is to be computed.

The representative grey value is determined as the median of that histogram.

By excluding from this calculation the pixel values that have low contrast-to-noise ratio, pixels in a very homogeneous image area which commonly do not represent relevant information are excluded from having too large an influence on the calculation of the median. Such pixels cover a large area in the image and either have a rather small pixel value (e.g. pixels of collimation borders) or a large pixel value (e.g. pixels in background area).

On the other hand, pixels with a very large contrast-to-noise ratio are likewise excluded because they correspond with very strong edges that are commonly found in image regions having a more extreme density.

This criterion is preferably defined in a way so that the representative grey value looked for roughly corresponds with the density of bone material.

In a preferred embodiment, the CNR image is determined at a predefined scale. It is computed by pixelwise dividing the image of local standard deviation at the predefined scale by the estimated noise level. Preferred embodiments of estimating the noise level and computing the image of local standard deviation are described above.

Preferably the CNR image is determined at a predefined scale that contains a major part of the relevant image information without being cluttered by noise.

Preferably this scale is the fourth scale when scales are counted from fine to coarse.

In the smaller scales the relative contribution of noise is larger whereas in the larger scales fine image details tend to disappear.

In the computation of CNR pixels the nominator is based on the local standard deviation at a predefined scale, typically the fourth scale. However, the denominator representing the noise is estimated at smallest scale for reason of robustness. The noise at larger scales will be smaller due to the repeated averaging processes in the multi-resolution decomposition. The noise at the scale of the nominator can be computed by multiplying the estimated noise at smallest scale by a certain conversion factor, which depends on the weighting factors in the multi-resolution decomposition scheme. The factor can be determined experimentally by estimating the noise according to the above method both at the smallest scale and at the requested scale, based on an image obtained from a uniform exposure, in which all contributions to local standard deviation can be assumed to be due only to noise. The conversion factor is the ratio of the estimated noise at requested scale to the estimated noise at the smallest scale.

This first criterion provides that the grey value histogram is placed on a fixed position in the dynamic range.

This approach provides good results. In case of underexposure however the applied amplification is rather large so that noise is emphasised too extensively.

b) Second Criterion: Constant Noise Level

In a second embodiment another criterion is applied.

According to this second criterion the aim is to bring the noise level to a constant target value in accordance with the formula $$G_n = T_n / \sigma_{0n}$$

wherein $G_n$ is a normalisation factor, $T_n$ represents the target noise level and $\sigma_{0n}$ is the estimated noise level.

The resulting normalisation factor is applied to all pixel values.

The noise level is preferably estimated on the basis of the finest scale of the multi-resolution representation of the image, as described above.

This second criterion results in a uniform impression of noise in all images.

However, if a different read out sensitivity is chosen, this has an influence on the contrast. Setting sensitivity low (e.g. sensitivity class 100) may result in a contrast which is too explicit, while setting the sensitivity class high (e.g. sensitivity class 400) may result in a contrast which is too weak.

c) Third criterion: Constant Contrast

In a third embodiment a still different criterion is applied. According to this criterion the aim is to bring the contrast of the most relevant area in the image to a constant level in accordance with the formula $G_c = T_c / \sigma_c$ wherein $G_c$ is a normalisation factor, $T_c$ is the envisaged contrast level and $\sigma_c$ is the original contrast.

This intrinsic image parameter is somewhat arbitrary because contrast highly varies in the image. The average contrast is not representative because the influence of homogeneous regions (having very low contrast) and of strong border pixels (having large contrast) would be dominating.

The original contrast is determined by computing the histogram of local standard deviation at a predefined scale that is sufficiently large to avoid predominance of noise, preferably at the fourth scale when scales are counted from fine to coarse. The original contrast $\sigma_c$ is defined as the median value of the local standard deviations in the histogram. The histogram of local standard deviation is computed as described above.

The influence of large homogeneous areas like collimation borders on the original contrast measure is substantially reduced by excluding from the histogram all those pixels of which the local standard deviation is inferior to a certain threshold. The threshold is specified proportional to the noise level. Preferably, the threshold is twice the noise level.

The noise itself is estimated at the smallest multi-resolution scale, as described above.

The noise at larger scales will be smaller due to the repeated averaging processes in the multi-resolution decomposition. The noise at the predefined scale at which the original contrast is computed by multiplying the estimated noise at smallest scale by a certain conversion factor, which depends on the weighting factors in the multi-resolution decomposition scheme. The factor can be determined experimentally by estimating the noise according to the above method both at the smallest scale and at the requested scale, based on an image obtained from a uniform exposure, in which all contributions to local standard deviation can be assumed to be due only to noise. The conversion factor is the ratio of the estimated noise at requested scale to the estimated noise at the smallest scale.

In this embodiment the aim is to have the same amount of contrast in all images. This results in a smoothed reproduction in case of images initially having high contrast, such as thorax images. This effect is only desirable to a limited extent since a complete compensation is experienced as being not natural.

d) Fourth Criterion

The inventors have found that the inconveniences that are enumerated at the end of the description of each of the first to the third embodiment are solved to a large extend if the normalisation factor $G_p$ is determined by combining the three criteria:

$$G_p = G_f^{p_l} \cdot G_n^{p_n} \cdot G_c^{p_c},$$

in which the exponents $p_l$, $p_n$, $p_c$, each having a value in the range [0,1] specify the relative contribution of each normalisation factor. This criterion is equivalent to one of the three mentioned above if one of the exponents is one, and the others are zero.

In our preferred embodiment $p_l$ is 0.5, $p_n$ is 0.25 and $p_c$ is 0.25.

4. Reducing Excess Contrast

The above normalisation may render an image which has not yet sufficient contrast.

The signal range defined as the difference between maximal and minimal pixel value in the image fluctuates in between images. The fluctuation is due to the applied kV, the filtering, the size of the patient, and to some extent also to the applied dose and the read out sensitivity.

A conventional technique consists of adapting the actual signal range to the range reproducible by the medium used for generating a visual image (film or display unit). To achieve this goal commonly a linear and/or non-linear re-scaling of pixel values is applied. The linear re-scaling is commonly referred to as window-level operation while the non-linear mapping is referred to as gradation processing.

In the current commercially available apparatus for reproducing digital medical images a combination of both techniques is applied. This approach is not optimal since the re-scaling has an influence on the image contrast and hence the image contrast may fluctuate between images.

According to this embodiment a non-linear conversion function is applied to pixels of all layers of the normalised multiscale representation.

In a particular embodiment the conversion function consists of an exponential component combined with a linear term, defined as follows:

$$q(x) = \frac{dd_0}{b^2} \cdot (1 - e^{-bx}) + \left(1 - \frac{dd_0}{b}\right) \cdot x \text{ wherein}$$

$$b = \frac{dd_0}{1 - d_1}, \text{ and } x >= 0$$

This conversion function has a fixed slope equal to 1 in the origin and evolves exponentially towards a linear behaviour, with asymptotic slope $d_1$. Abscissa and ordinate values are expressed as normalized units in the range [0,1].

Small input values are left (substantially) unmodified while large input values are attenuated to an extent determined by the slope $d_1$. The smaller $d_1$, the more the very high contrast transitions within the image will be attenuated. The final slope $d_1$ must be in the range [0,1], with most preferable value 0.5.

The parameter $dd_0$ determines how fast the slope of the function decreases towards its final value $d_1$. It is equal to the second derivative of this function in the origin. Its preferred value is in the range [0,30], most preferably it should be 5. If $dd_0$ is 0, then the function is linear with unity slope, and no effect takes place.

In order to cope also with negative values x<0, the conversion function is extended in the negative domain such that $q(x)=-q(-x)$, i.e. $q(x)$ must be odd.

Figure 3:
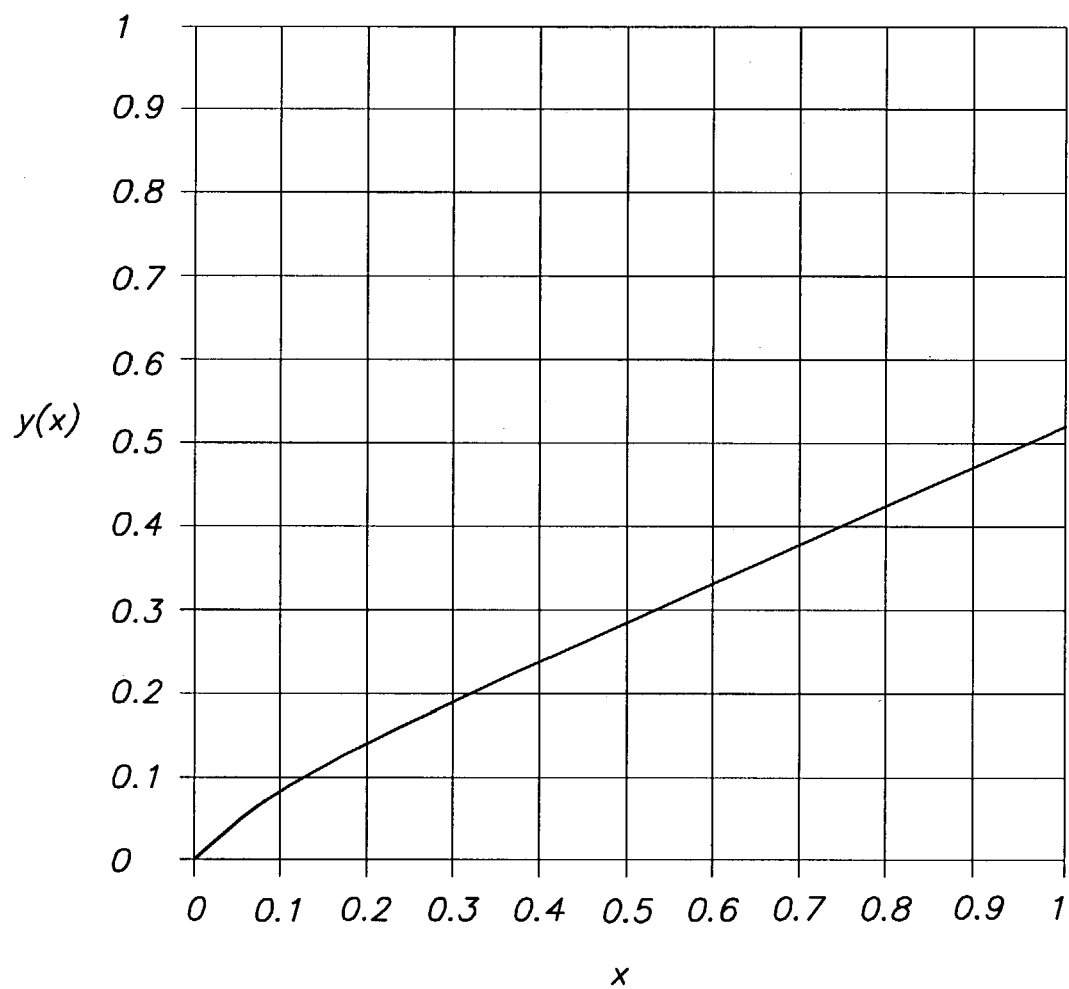
FIG. 3 is a conversion function applied for reducing excess contrast.

The positive part of the function is plotted in FIG. 3.

Other implementations of the conversion function for reducing excess contrast are possible. As a basic requirement the amplification ratio $q(x)/x$ should be decreasing in the upper pixel value subrange. The conversion function may be equally applied to all layers, or only to a subset, in that case preferably to the larger scale layers.

By applying this approach the contrast is upheld in general. Only at very strong transitions in the image that have a large contribution to the dynamic range, the contrast is changed. In these locations the pixels of the normalised multiscale representation are attenuated so that the signal range is decreased. This approach is advantageous in that images with a dynamic range that is too large can be affected with a minimal perturbation of the overall impression of contrast.

5. Enhancing Details Having Subtle Contrast.

By the exponential conversion described higher only image components having large contrast are influenced so that the signal range is kept within limits.

It is then still an object of this invention to enhance the reproduction of subtle details, which are considered to be most relevant.

To achieve this goal, the above conversion function for reducing excess contrast is modulated by a function for subtle contrast enhancement.

In a particular embodiment the function for subtle contrast enhancement is defined as follows:

$$z(x) = 1 + c \cdot \frac{\tanh(a \cdot x)}{1 + \frac{a \cdot c}{b - 1} \cdot x}$$

wherein the parameter a controls the input value $x_p$ at which the amplification is maximal, the parameter b controls the amount of contrast enhancement and the parameter c controls the initial slope of the amplification function, i.e. the slope at input value zero.

At zero input this function has a value one (which means no enhancement), next it increases sharply to a maximum, and from there it falls off again to an asymptotic value of one. Hence its enhancement effect is concentrated within a narrow region, which is controlled by the parameter a. The latter is adjusted in order to apply most enhancement to the details which have contrast in a sub-range which is considered to be most relevant.

The function for subtle contrast enhancement is combined with the conversion function for reducing excess contrast. The resulting composite function is defined by:

$$y(x) = q(x) \cdot z(x)$$

As a consequence of applying this modulation, pixel values of the normalised multiscale representation in the neighbourhood of the modulation peak corresponding with subtle contrast details are amplified, while the input ranges of very small pixel values corresponding mostly with noise, and the larger input values corresponding to well visible image features are not significantly altered. The very large input values that represent excessive contrast, are reduced by the first factor in the composite function.

The parameter a is preferably chosen so that the modulation peak corresponds with a pixel value of the normalised multiscale representation that can be qualified as representing most relevant 'subtle contrast'. The appropriate value for the parameter a depends on the many scaling factors applied throughout the imaging chain and the multi-resolution decomposition. In practice, the range of subtle contrast corresponds to 0.7 to 3.0 times the noise level.

In a particular embodiment the point of maximal contrast boosting controlled by the parameter a is made proportional to the noise level.

This is advantageous in that it is avoided that details having very low contrast would be emphasised too much. This might occur in homogeneous areas where the normalised multiscale pixels in most cases represent noise.

In a particular embodiment the maximum amplification determined by the parameter b is between 1 and 5, most preferably it is 2.

The preferred value of c is such that the relative initial slope of the function is 3. The relative initial slope is the slope of z(x) in x=0, relative to the average slope of the increasing section of the function, which is equal to $z(x_p)/x_p$, wherein $x_p$ is the abscissa of maximum amplification.

Figure 4:
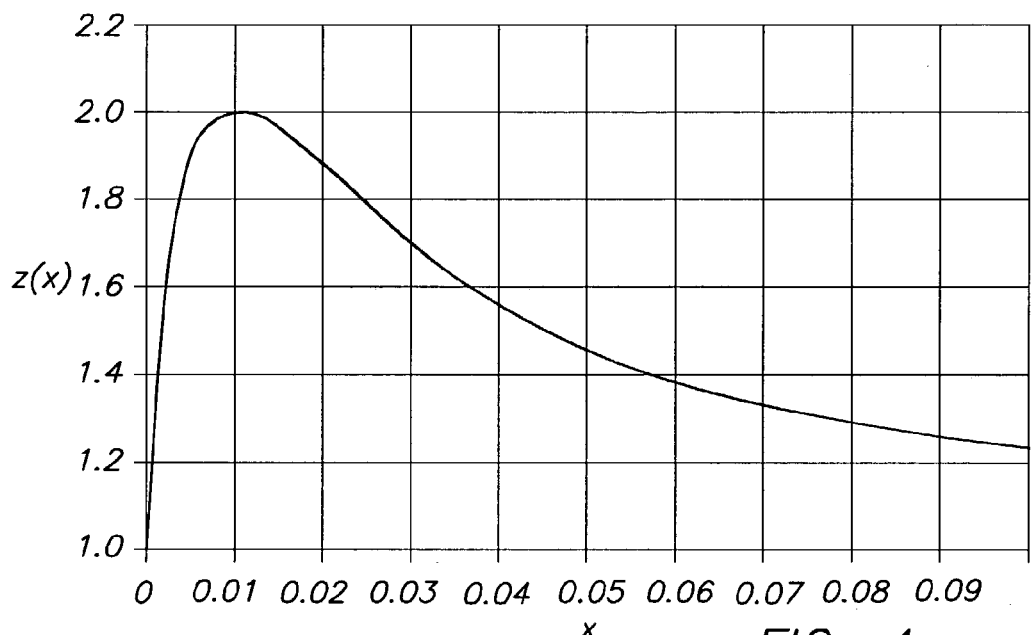
FIG. 4 is a conversion function additionally applied for boosting subtle contrast.

FIG. 4 shows the function z(x) for a=56.3, b=2.35, c=10.7, which corresponds to a peak amplification of 2 at $x_p$=0.01. The initial slope is three times the average slope of 2/0.01.

In this way it is possible to render visible low-contrast image details with enhanced contrast. Low-contrast image details are not restricted to specific sizes. They can be small scale like trabecular bone texture or septal lines, medium scale such as blood vessels, or large scale like extended nodules or soft tissue structure. If the visibility of such image details is poor because of low contrast, the above method will render those subtle details by enhancing their contrast.

Examination types for which subtle contrast is of major importance are commonly high dose examinations. They are performed with low read-out sensitivity and hence also have a better signal-to-noise ratio. In an alternative embodiment the maximum amplification determined by the parameter b is made dependent on the signal-to-noise ratio. The higher the SNR, the more b is increased.

An exception to this principle is found in paediatric applications where the dose is kept low in order to protect the young patient although subtle detail is important.

In still another embodiment, the parameter b is made dependent on the scale, i.e. a series of values of $b_s$ is predefined, one for each scales.

In still another embodiment, the parameter b is made dependent on the underlying tissue type, as will be described further on.

Figure 5:
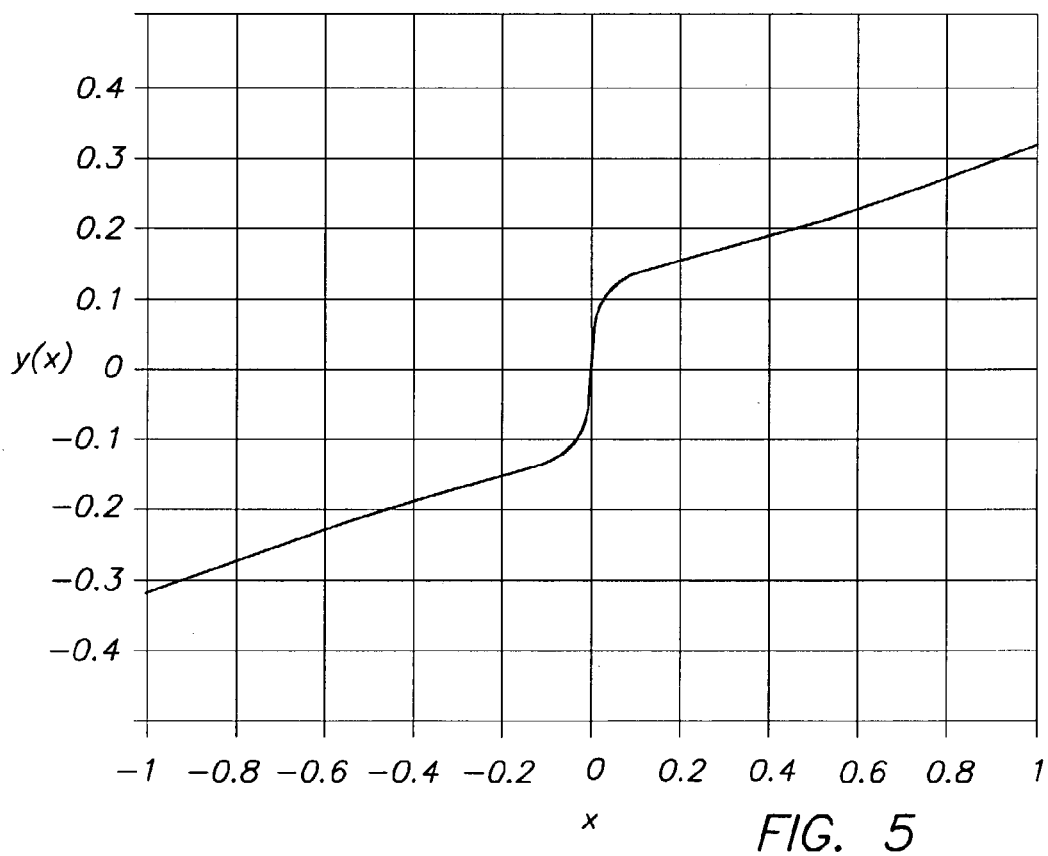
FIG. 5 is a composite conversion function.

In this particular embodiment the conversion function y(x) is constructed by multiplicative composition y(x)=q(x)·z(x), as depicted in FIG. 5. The exact shape of the function and the way it is constructed is not critical. Many alternative embodiments are applicable, as long as the conversion function complies with the following constraints:

1) It has to be monotonically increasing, i.e. its slope dy/dx is positive across the entire domain.
2) It has to be odd, i.e. y(-x)=-y(x). This requirement ensures that enhancement is equally applied irrespective of contrast polarity.
3) For large argument values x the amplification ratio y(x)/x has to be decreasing. This ensures that contrast is reduced at very strong transitions in the image that have a large contribution to the dynamic range.
4) The amplification ratio y(x)/x has to have a local maximum in order to provide maximum enhancement within an intermediate subrange of argument values which is considered most relevant. This ensures that the most relevant image details like trabecular bone texture, septal lines, blood vessels, nodules, and soft tissue structure are appropriately rendered.

Figure 6:
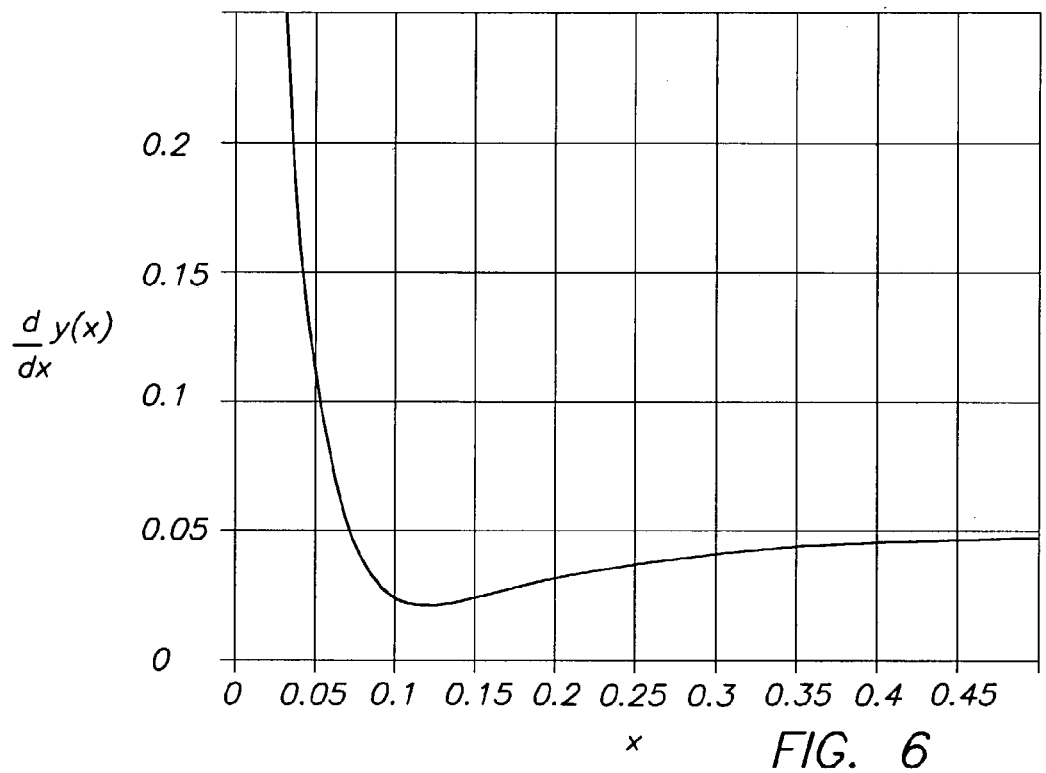
FIG. 6 shows the composite conversion function derivative which has a local minimum.
Figure 7:
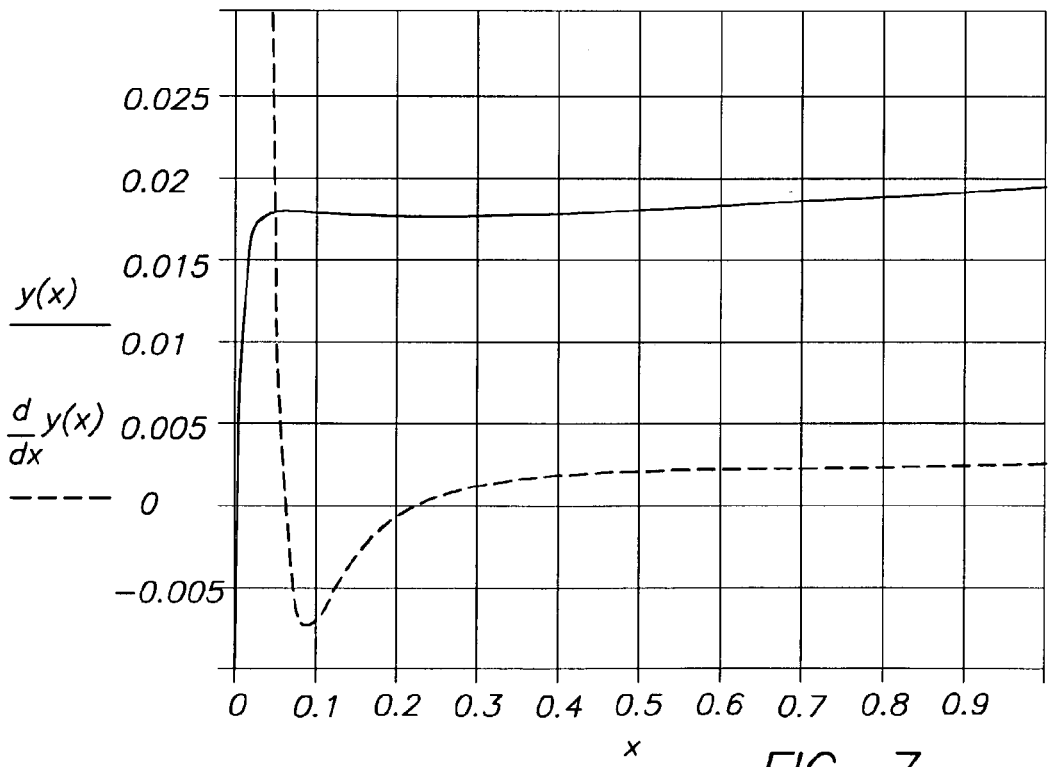
FIG. 7 shows a non-compliant case of a composite conversion function (solid line) which is not monotonic, along with its derivative (dotted line)

It is important to verify that the requirement 1) of monotonicity is not violated as a consequence of providing a local amplification ratio maximum. For, the slope of the composite curve will decrease due to the decreasing amplification beyond its local maximum. The slope may evolve to a local minimum, and then gradually increase to a final value. This is illustrated in FIG. 6. The steeper the amplification peak, the closer the slope minimum approaches zero. This is allowed to the extent that the slope does not become negative. The latter non-compliant case is depicted in FIG. 7, which shows a non-monotonic curve.

The monotonicity can be verified experimentally using numerical software tools (e.g. Mathcad, MathSoft Inc.) In our preferred embodiments described above this will be met if the parameter settings of both the conversion function for reducing excess contrast and the function for enhancing subtle contrast are set in accordance with the listed recommendations.

6. Contrast Enhancement in High Frequency Bands

The image becomes sharper when more weight is put on the images at the finest scales of the normalised multiscale representation.

In a first embodiment sharpening is realised by pixelwise multiplying the layers of the normalised multiscale representation with a coefficient that depends upon the scale.

The coefficient is greater than one at the finest scale (scale 0), and it gradually decreases to a value of one at the medium scales, and it further remains one at the larger scales.

In a second embodiment, the image is sharpened by making the parameter b that determines the contrast enhancement of subtle details dependent on the scale. This is realised according to the present invention by giving the parameter b a maximum value at scale 0, and by decreasing the value of this parameter b according to a geometric series at medium scales and then further keeping the parameter constant at the larger scales.

In comparison with the first embodiment of sharpening, the approach of this second embodiment provides that the amplification of small-scale detail is only exerted in points having subtle contrast. In this way unnecessary boosting of noise and sharp (strong) borders can be avoided.

7. Tissue-specific Contrast Adjustment

In most cases, it is preferred to have additional fine-scale contrast in the bone regions, e.g. to enhance the trabecular structure, or to better visualise potential fractures. To this end additional contrast adjustment is provided based on a segmentation map. The segmentation map is an image in which the pixels are labeled in accordance with the apparent underlying tissue type. In a preferred embodiment, different labels are assigned to pixels belonging to either bone, soft tissue, and background regions.

Methods for carrying out segmentation are described in literature, e.g. "Segmentation of Bone and Soft Tissue Regions in Digital Radiographic Images of Extremities", S. K. Pakin, R. S. Gaborski, L. L. Barski, D. H. Foos, K. J. Parker, SPIE Proc. vol 4322, pp. 1296–1302, 2001.

Tissue-specific adjustment is carried out by pixelwise multiplying the layers of the normalised multiscale representation by a coefficient $a_{s,u}$ which is obtained from a predefined tissue coefficient table, in which s is the scale of the current layer and u is the tissue label of the corresponding pixel in the segmentation map. Proper subsampling or interpolation is needed if the segmentation map and the current layer have different dimensions.

The preferred coefficients of the tissue coefficient table depend on the set of distinct labels provided by the segmentation map, and may depend on dedicated requirements of specific examinations. However in the case of general radiology the following default coefficient values are recommended.

| scale | bone | soft tissue | background |
|-------|------|-------------|------------|
| 0 | 1.5 | 1 | 0.7 |
| 1 | 1.5 | 1 | 0.7 |
| 2 | 1.3 | 1.15 | 0.7 |
| 3 | 1.15 | 1.3 | 0.85 |
| 4 | 1 | 1.3 | 1 |
| 5 | 1 | 1.15 | 1 |
| 6 | 1 | 1 | 1 |

The settings for bone ensure that the trabecular structure and potential fractures are better visualised. The soft tissue coefficients are chosen to enhance the contrast of lesions and normal anatomy, and the background coefficients are chosen to provide less noise.

In an alternative embodiment, the tissue coefficients as specified in the above table are not multiplicatively applied to the pixels of the multiscale representation, but are used instead to amplify or attenuate the parameter b that specifies the amount of subtle contrast enhancement, as described above. This is preferably done in each pixel of all layers of the normalised multiscale representation.

8. Local CNR-based Contrast Adjustment

The noise reduction method disclosed in prior art document EP 574 969 is based on a selective attenuation of pixels of the smaller scales of the multiscale representation (more particularly of the three smaller scales).

In each of these images the local variance is calculated around each pixel. Next the local variance is compared with the noise variance.

If the local variance is significantly larger than the noise variance, it is assumed that the captured pixel comprises relevant image information and no attenuation is applied.

On the other hand, if the local variance approximates the noise variance, the image area is considered to be homogeneous and the pixel of the multiscale representation is attenuated in order to be locally decrease the contrast.

In this prior art method the attenuation coefficients are determined for a multi-resolution scale independent of the layers at other scales, taking as a reference the noise level at the current scale. This approach has the following drawback.

In one and the same pixel the attenuation coefficients of successive scales can largely differ because the correlation between pixels at successive scales is limited and because the calculation of the attenuation is a nonlinear operation.

This fact introduces additional noise having small magnitude but a rather artificial pattern.

To overcome this drawback an alternative approach has been developed.

According to this concept, the local attenuation in each layer of the normalised multiscale representation to which noise reduction is applied is derived from a single base CNR image that represents local contrast-to-noise ratio (CNR) at a predefined scale.

The base CNR image is determined as follows. First a local CNR image at a predefined scale is computed as described above. The predefined scale is chosen to be the smallest scale at which the contribution of relevant information is significant.

Practice has learnt that the fourth scale is preferred. Next, the resulting image is smoothed to further eliminate the effect of high-frequency noise. This is done by applying a low-pass filter, yielding a base CNR image. Preferably, the low-pass filter is choosen to reduce the spatial bandwidth by a factor of two.

Each pixel of all layers of the normalised multiscale representation that participate in the local CNR-based contrast adjustment is multiplied by an attenuation coefficient a that is computed in each pixel as follows:

$$a = \left(\frac{cnr_0}{cnrc}\right)^q \text{ if } cnr < cnr_0$$

$$a = \left(\frac{cnr}{cnrc}\right)^q \text{ if } cnr_0 \leq cnr \leq cnr_1$$

$$a = \left(\frac{cnr_1}{cnrc}\right)^q \text{ if } cnr > cnr_1$$

wherein a is an attenuation coefficient at a given point, cnr is the local contrast-to-noise ratio at the corresponding pixel of the base CNR image, cnrc is a predefined critical contrast-to-noise ratio, and q determines the amount of contrast adjustment. If the dimensions of the base CNR image differ from the dimensions of the current layer to which attenuation is applied, then the base CNR is appropriately interpolated.

Figure 8:
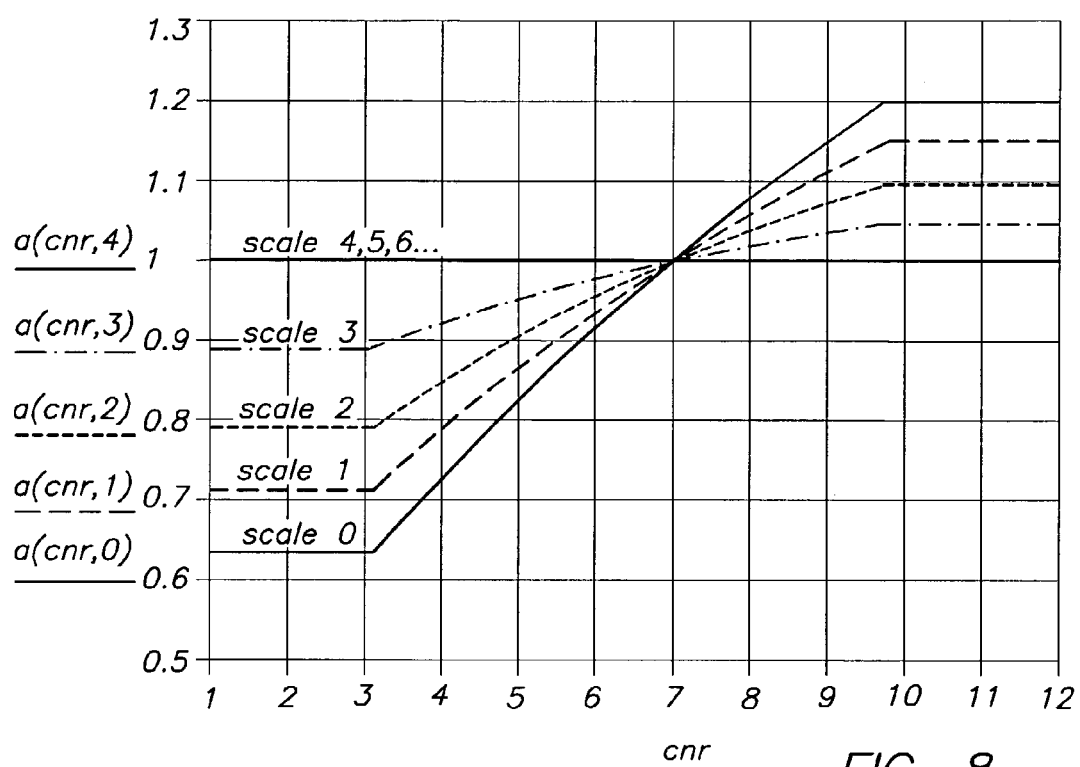
FIG. 8 shows the attenuation coefficient as a function of local contrast to noise ratio at successive scales.

The plot in FIG. 8 shows the attenuation coefficient a as a function of local CNR at successive scales.

The critical contrast-to-noise ratio parameter cnrc is the contrast-to-noise ratio for which no attenuation is applied (a=1).

If cnr<cnrc then the contrast is attenuated by an amount which is determined by the exponent q.

If cnr is greater that the critical value cnrc, then a becomes greater than 1 so that local contrast is amplified.

In this way it is prevented that the global contrast perception in the image is significantly affected by the noise limitation.

In homogeneous areas contrast will be decreased but in texture areas the contrast is somewhat increased. In a preferred embodiment, the critical contrast-to-noise ratio parameter cnrc is in the range [5,10], preferably it is 7. The preferred value will differ however depending on scaling factors and weights used throughout the method of multiscale decomposition, of determining local contrast, and of estimating the noise. It is preferably verified experimentally.

The parameters $cnr_0$ and $cnr_1$ specify the bounds of the range of CNR values within which the attenuation a is a function of CNR. Beyond these bounds, the attenuation attains a fixed minimum or maximum value respectively. This clipping avoids excessive attenuation or enhancement of the local contrast.

The CNR bounds are computed by:

$$cnr_0 = cnrc \cdot 10^{-0.1 \cdot \frac{wtr}{1+ncp}}$$

$$cnr_1 = cnrc \cdot 10^{0.1 \cdot \frac{ncp \cdot wtr}{1+ncp}}$$

in which wtr is a parameter that specifies the dynamic range of CNR values expressed in dB within which the attenuation a is a function of CNR, and ncp specifies the amount of compensation for loss of sharpness, which must be in the range [0,1].

The exponent q is computed by:

$$q = \left(1 - \frac{s}{N_S}\right) \cdot (1 + ncp) \cdot \frac{att}{wtr} \quad \text{if } s < N_S$$
$$q = 0 \quad \text{if } s \geq N_S$$

where s is the scale of the current layer, and Ns the number of layers involved in the local CNR-based contrast adjustment process. The scale s is defined to increase from small scale to large scale, starting from zero. Because the importance of noise decreases with increasing scale, the amount of noise reduction is decreased at larger scales relative to the noise reduction at smaller scales. In all cases, the attenuation coefficient a evolves gradually to 1 as the scale s approaches Ns, which means that from this scale on, the local CNR-based contrast adjustment has no effect anymore. Preferably, Ns is in the range [2,5], most preferably it is 4. The amount of attenuation is specified by the parameter att, which equals the strongest attenuation at zero scale, expressed in dB, i.e.:

$$att = -10 \log a_0,$$

in which $a_0$ is the attenuation coefficient that will be found in those regions of layer zero where CNR$\leq$cnr0. Preferably the attenuation att is in the range [0, 6 dB], most preferably it is 2 dB.

The parameter ncp determines to which amount the global impression of loss of sharpness due to contrast reduction in low CNR regions, is to be compensated by increasing the local contrast in high CNR regions. In the extreme case where ncp is zero, there will be no compensation for loss of sharpness, which means that the attenuation coefficient a in the zero scale layer will be in the range $[a_0, a_1=1]$. Maximum compensation is achieved by setting ncp to one, in which case the maximum enhancement is equal to the inverse of the maximum attenuation. In this case, scale zero attenuation coefficients will be in the range $[a_0, a_1=1/a_0]$. The parameter ncp is preferably set to 0.4 in order to have partial compensation of sharpness loss. The parameter wtr is preferably set to 3 dB. If the parameters are set to the above preferred values, att=2 dB, wtr=3 dB, cnrc=7, ncp=0.4, then the derived parameters at scale zero will have the following values:
$cnr_0$=4.274, $a_0$=0.631, $cnr_1$=8.527, $a_1$=1.202, q=0.933.

At scale 1 the derived parameters will be:
$cnr_0$=4.274, $a_0$=0.708, $cnr_1$=8.527, $a_1$=1.148, q=0.7.

The functions that express the dependency of the attenuation coefficient a upon local CNR at successive scales are plotted in FIG. 8.

In a particular embodiment the attenuation coefficients a for a certain scale are provided in the form of an image matrix, referred to as attenuation coefficient-matrix, the latter having dimensions equal to the dimensions of the corresponding layer of the normalised multi-scale representation. The effective attenuation is obtained by pixel-wise multiplication of the attenuation coefficient-matrix with the pixels of the corresponding image of the multi-resolution decomposition.

With the above method, the image regions in which the average radiation contrast is very small, i.e. in homogeneous regions where noise it most disturbing, the contrast will be lowered. On the other hand it will be raised in those image regions where there is a significant portion of edges or textures.

9. Reconstruction

When the above procedures for contrast enhancement have been performed, the image is reconstructed by applying to the modified detail images the image transform that is the inverse of the multi-resolution decomposition.

Details on the reconstruction procedure are described higher in the paragraph relating to image decomposition.

10. Gradation Processing with Three Control Points

After image reconstruction the image is not yet ready for reproduction on film or for display on a monitor because the signal range does not yet correspond to the output range of the reproduction system (hard or soft copy).

The conversion of pixel values into output values suitable for reproduction commonly comprises a selection of a sub-range comprising the relevant information followed by a conversion which is in most cases a non-linear conversion. This conversion is referred to as gradation processing.

For optimal reproduction it is of ultimate importance that the selection of the relevant signal range is performed in a consistent way and that the shape of the conversion function applied for gradation processing is determined carefully. This conversion determines to a large extent the quality of the visible image as far as average density and overall contrast is concerned.

In the state of the art the selection of the sub-range and the selection of the gradation curve depends on the examination type which was entered into the processing system. Moreover, the selection of the relevant sub-range was performed on the basis of the image histogram. Pixels belonging to the collimation borders were not considered.

Therefore it was required to detect the collimation borders in advance. Because of the wide diversity of images and the complexity of this problem, a certain percentage of failures is inevitable (around 1%). As a consequence the correct operation of the detection of the relevant signal range is affected. It is an object of the present invention to enable selection of the relevant signal sub-range without using any knowledge of the collimation borders.

According to the present invention a gradation processing operation is developed which is controlled by three characteristic points in the image histogram.

A gradation curve is generated which yields a fixed contrast and a fixed density in one specific point, referred to as anchor point.

In the state of the art the gradation curve abscissa axis is related to the logarithm of radiation dose, and the ordinate axis may be optical density, luminance, driving values of specific display systems, or else perceptually linear units (p-values), as specified by the DICOM 3.14 standard. The main reason why the abscissa axis represents the logarithm of radiation dose originates from the X-ray film technology, in which the sensitivity curve of the screen-film system, the so-called H-D curve, is specified in terms of optical density as a function of logarithm of exposure.

A second reason for expressing the abscissae in logarithm of dose is related to the way the curve is manipulated for the purpose of contrast and density adjustment. Shifting the curve along the abscissa axis is equivalent to multiplying the dose by a certain factor. Hence, a simple shift of the curve (so-called level-adjustment) allows to correct for under of overexposure. Modifying the level is the equivalent of selecting a film-screen combination with a different speed class.

In a preferred embodiment, the input to the image chain is a digital image the pixel values of which are proportional to the square root of radiation dose, as explained above.

Square root semantics are preserved throughout the image chain, including multiscale decomposition, a series of contrast manipulation methods applied to the multiscale representation, and finally, an inverse multiscale transform.

According to the present invention the result of the image chain with square root of dose semantics is used as the input quantity of gradation processing without conversion into logarithm of dose semantics. Gradation processing is specified to map this pixel quantity onto an ordinate axis that represents perceptually linear units according to a function that is linear with a fixed slope in the central portion of its domain. The combination of imposing square root semantics on the abscissa, applying a gradation curve that is essentially linear, and imposing a perceptually linear semantics on the ordinate axis, e.g. in accordance with the DICOM 3.14 standard, assures that the image noise due to quantum mottle will be perceived uniform in the viewed image across the entire density range.

The latter only holds if the nonlinear operations applied to the multiscale representation for the purpose of contrast enhancement are kept small, such that the entire part of the image chain from multiscale decomposition through inverse transform can still be considered a linear operation.

In this preferred embodiment it is also assumed that the output image that results from gradation processing is transmitted to a hard- or softcopy device that accepts image data with perceptually linear semantics. This is true with new generation film printing devices and display monitors that are compatible with the DICOM 3.14 standard. It is assumed in the further description that the output image is expressed in terms of perceptually linear units, called p-values. If the output image is to be sent to a non-standardised device however, an appropriate additional conversion has to be applied to the output image in order to match the specific input semantics of the device, which may be either optical density, luminance or proprietary semantics. How to do this is described in the DICOM 3.14 standard specification.

Figure 9:
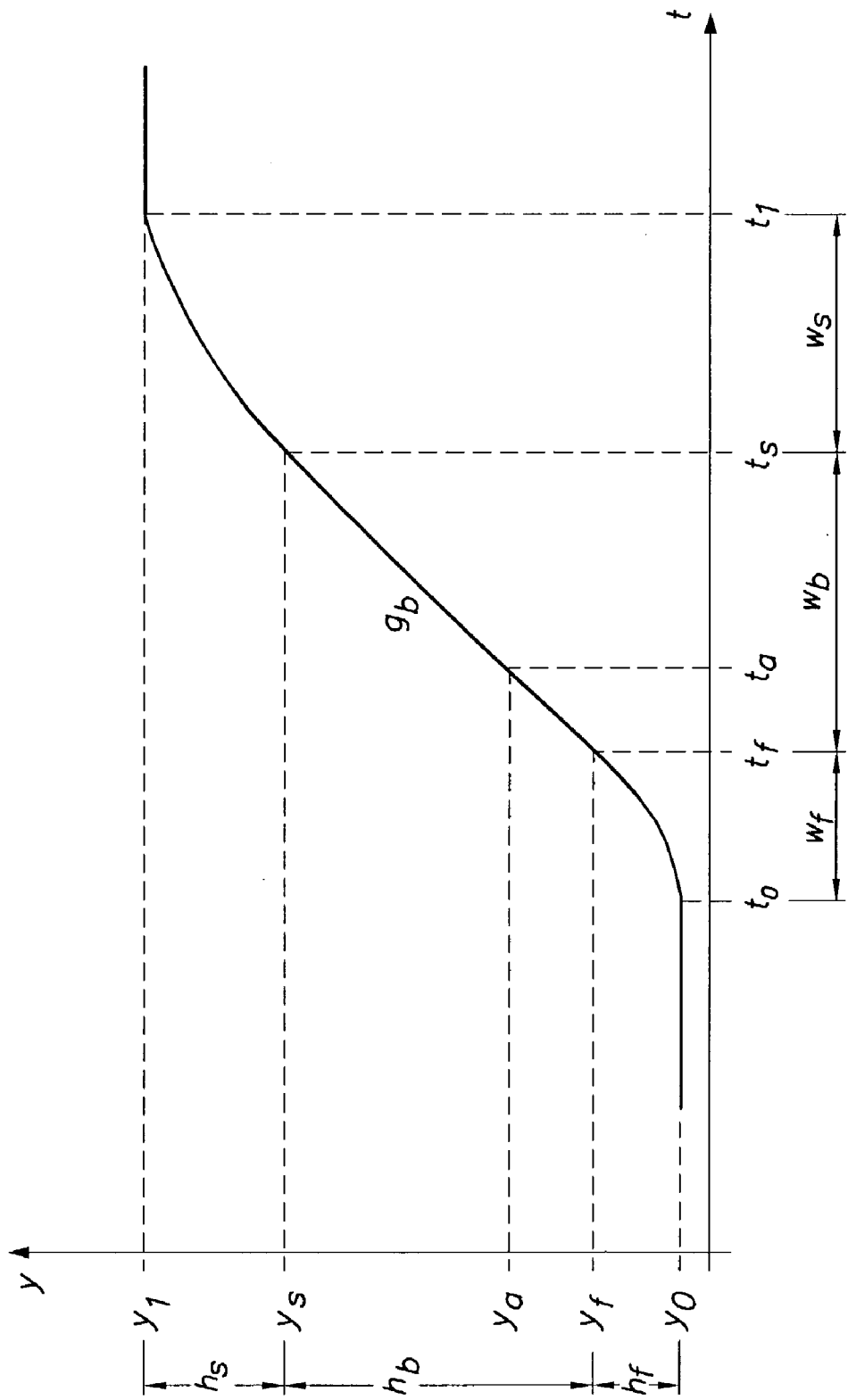
FIG. 9 shows an embodiment of a gradation curve composed of three contiguous segments.

Preferably the gradation curve is composed of three contiguous segments, as depicted in FIG. 9, termed foot, body and shoulder segments, respectively. The segments are defined in such a way, that the composite gradation curve is continuous along its entire domain, and also its derivative is continuous.

The body segment is linear, and it ensures fixed predefined slope gb across the body subrange wb, which is intended to coincide with the most relevant subrange of pixel values. The foot segment spanning the foot subrange wf provides a gradual increase of slope from a predefined initial slope go up to the body slope gb. The corresponding subrange is considered a transition zone from the lowest pixel values that carry no diagnostically relevant information, up to the most relevant body subrange. The foot segment is characterised by its subrange width wf and height hf on the ordinate axis. Its average slope gf is defined by the ratio hf/wf. The initial ordinate value of the foot segment corresponds with the smallest value of the ordinate range y0, i.e. the smallest possible value of the output image. In a preferred embodiment, y0 is zero. The transition point from foot to body is specified by the abscissa tf. The shoulder segment spanning the subrange ws provides a gradual decrease from the body slope gb down to a predefined final slope g1. This segment is characterised by its width ws and a predefined average slope gs, which defines the ratio hs/ws, in which hs is the shoulder segment height on the ordinate axis. The final ordinate value of the shoulder is made to coincide with the greatest value of the ordinate range y1. In a system with 12 bit output, y1 will be 4095.

The body segment has a predefined slope gb and a predefined anchor point ta. The anchor point has a predefined output pixel value ya. This condition ensures that contrast and density remain fixed in the anchor point.

The width of the foot, body and shoulder segments is not specified explicitly. Instead, for each individual image three characteristic pixel values are determined, which specify the lower foot bound t0, the anchor point ta and the upper shoulder bound t1.

The other parameters that determine the shape of the composite gradation curve are predefined, i.e. they do not depend on any characteristic of the individual images. Given the predefined parameters and the parameters t0, ta and t1 which are determined specifically for each image, a composite gradation curve is determined that spans the cumulative abscissa subrange wf+wb+ws and is the corresponding ordinate range [y0, y1], in compliance with the above requirements of continuity.

One embodiment of the composite gradation curve is defined by:

$$y(t) = y0 + hf \cdot f\left(\frac{t-t0}{wf}\right) \quad \text{if } t \text{ is in the foot subrange}[t0, tf[$$

$$y(t) = y0 + hf + gb \cdot (t-tf) \quad \text{if } t \text{ is in the body subrange}[tf, ts]$$

$$y(t) = y1 - hs \cdot s\left(\frac{t1-t}{ws}\right) \quad \text{if } t \text{ is in the shoulder subrange}]ts, t1]$$

In this embodiment the function that corresponds with the foot segment is defined by:

$$f(x) = x \cdot g_{0f}^{1-x^{pf}} \quad \text{in which:}$$

$$g_{0f} = g0 \cdot \frac{wf}{hf} \quad \text{is the relative initial foot slope}$$

$$pf = \frac{1 - gb \cdot \frac{wf}{hf}}{\ln(g_{0f})}$$

In this embodiment the function that corresponds with the shoulder segment is defined by:

$$s(x) = x \cdot g_{1s}^{1-x^{ps}} \quad \text{in which:}$$

$$g_{1s} = g1 \cdot \frac{ws}{hs} \quad \text{is the relative final shoulder slope}$$

$$ps = \frac{1 - gb \cdot \frac{ws}{hs}}{\ln(g_{1s})}$$

The above formulation of the foot and shoulder segments based on concatenated exponentials ensures that:

y(t0)=y0, and y(t1)=y1 continuity is guaranteed in the transition points y(tf) and y(ts)

y'(t0)=g0 and y'(t1)=g1 the slope is continuous in the transition points y'(tf) and y'(ts), and it has a constant value gb in between the output has a predefined value ya in the anchor point ta.

The latter two features ensure that the most relevant subrange of pixel values associated with the body segment has a specified density and contrast.

The position of the anchor point ta, the lower foot segment bound t0 and the upper shoulder segment bound t1 are made dependent on the image subrange characteristics, as will be described further on.

Any variation of the lower subrange width [t0,ta] as imposed by the image characteristic does not influence the density and contrast of the pixel values greater than ta. This is important because the required lower subrange width may largely vary due to the presence of radio-opaque material in the image, such as markers or collimation shutters. According to the present invention the variation of lower subrange width [t0,ta] only affects the density and contrast of pixel values smaller than the anchor point ta, and the closer a lower subrange pixel value approaches ta, the less its contrast and density will depend on the lower subrange width. The rationale behind this mechanism is the observation that contrast should be kept as constant as possible, but if the average slope has to be diminished because of increasing lower subrange width, it is better to give up contrast preferably in the lowermost density range, which carries virtually no relevant information, and keep the contrast intact in the vicinity of the anchor point.

Similar benefits of this method also hold in the upper subrange [ta, t1], in which contrast is preferably sacrificed in the uppermost density range as the upper subrange width is increasing, in order to preserve contrast in the subrange portion adjacent to the anchor point ta, in which subrange there is much more relevant information.

In a first preferred embodiment, the following parameters are predefined: y0, ya, y1, g0, gf, gb, gs, g1. The other parameters which are needed to generate the above composite gradation curve, i.e. wf, hf, ws, hs, are derived as follows.

The width wf and height hf of the foot segment are found by solving the set of equations, which specify the heights of the left body part and foot segment, respectively:

$$ya-y0-hf=(ta-t0-wf) \cdot gb$$

$$hf=wf \cdot gf$$

yielding:

$$wf = \frac{(ta-t0) \cdot gb - ya + y0}{gb - gf}$$

$$hf=wf \cdot gf$$

Similarly, the width ws and height hs of the shoulder segment are found by solving the set of equations, which specify the heights of the right body part and shoulder segment, respectively:

$$y1-ya-hs=(t1-ta-ws) \cdot gb$$

$$hs=ws \cdot gs$$

yielding:

$$ws = \frac{(t1-ta) \cdot gb - y1 + ya}{gb - gs}$$

$$hs=ws \cdot gs$$

The predefined values preferably lie in the following ranges:

ya: [10,40], default 20% of output range [y0,y1]

gb: depends on internal scaling factors throughout the imaging system, and on the available output range g0: [10,30], default 20% of body slope gb gf: [25,50], default 40% of body slope gb gs: [25,50], default 40% of body slope gb g1: [5,20], default 10% of body slope gb In any case the slopes must respect the following inequalities:

g0<gf<gb g1<gs<gb

The foot and lower body segments evolve as follows with varying lower subrange. If t0 exceeds a maximum bound t0u, then it is set to this value $$t0 \leq t0u = ta - \frac{ya - y0}{gb}$$

Figure 10:
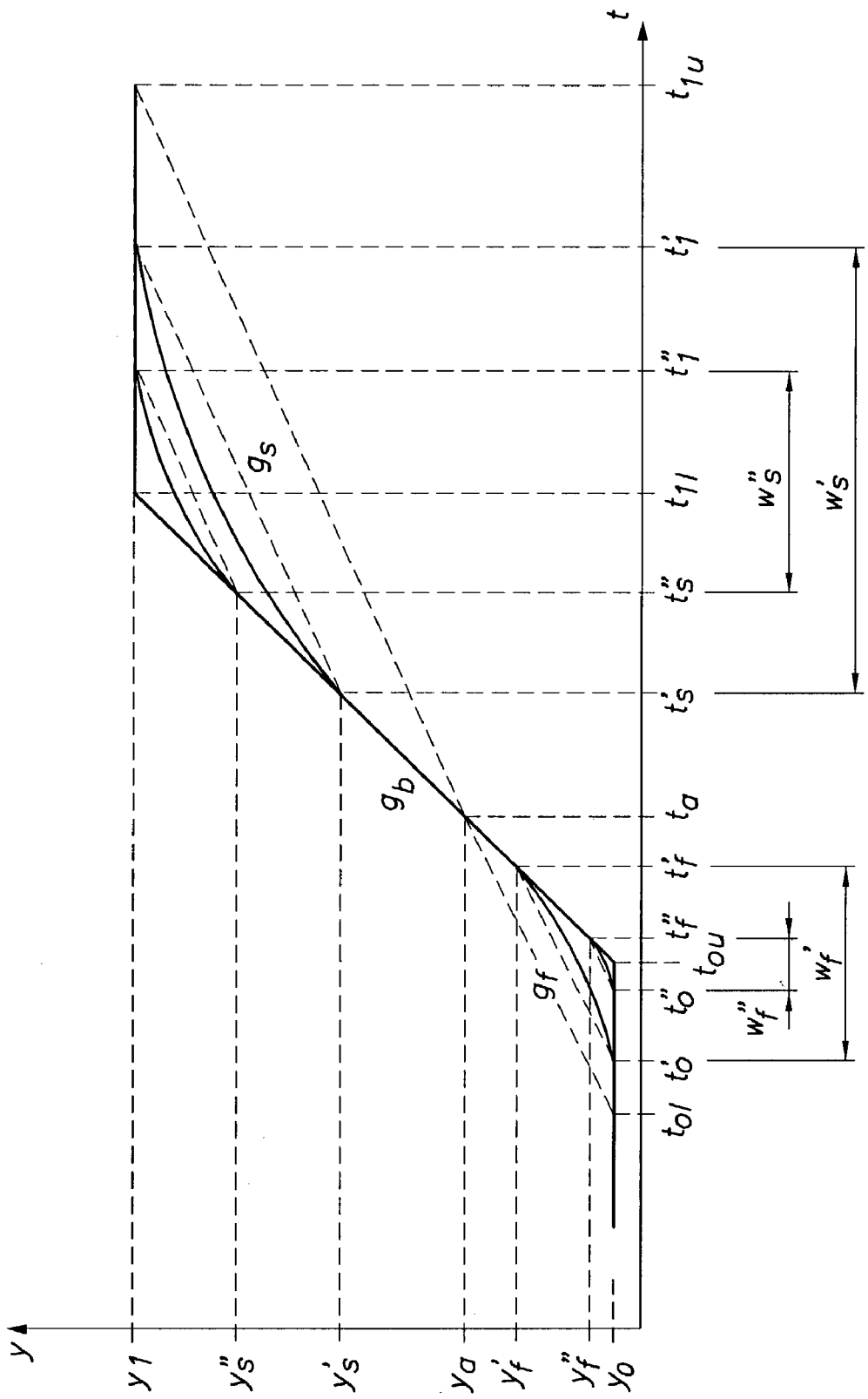
FIG. 10 illustrates the evolution of the gradation curve with varying subrange (first embodiment)

In this case, the foot segment is collinear with the body segment. See FIG. 10.

If the width of [t0, ta] increases, then a foot segment is emerging in the lower subrange. The foot segment becomes more significant at the expense of the linear part as the lower subrange width further increases. [E.g. in FIG. 10 when it evolves from w"$_f$ to w'$_f$.]

Ultimately, a lower limit for t0 is reached, t0l, defined by:

$$t0 \geq t0l = ta - \frac{ya - y0}{gf}$$

The upper body segment and shoulder evolve in a similar manner. The bounds for t1 are defined by:

$$t1 \geq t1l = ta + \frac{y1 - ya}{gb}$$

$$t1 \leq t1u = ta + \frac{y1 - ya}{gs}$$

In that case the foot extends from toe to ta.

The bounds of t0 and t1 may be further constrained in order to ensure that foot or shoulder cannot entirely vanish, i.e. a minimum foot and shoulder width are specified. Preferably, hf and hs should be enforced to be at least 10% of the output range [y0,y1]. This avoids abrupt changes of contrast in the vicinity of the subrange bounds t0 and t1, respectively.

Further constraints may be imposed to the bounds of t0 and t1 in order to enforce a minimum or maximum portion of body segment left or right of the anchor point ta. With this measure one can ensure that there is at least a central portion of the gradation curve that is entirely linear.

In a second preferred embodiment, the following parameters are predefined: y0, ya, y1, g0, gb, gs, g1. Furthermore, the foot-to-body transition point is set equal to the anchor point, i.e. tf=ta and correspondingly, yf=ya. The other parameters which are needed to generate the above composite gradation curve, i.e. wf, hf, ws, hs, are derived as follows.

The foot width and height are defined by:

$$wf = ta - t0$$

$$hf = ya - y0$$

The combined segment width of body and shoulder is equal to $$wbs = t1 - ta$$

The widths of the body segment wb and of the shoulder segment ws are found by solving the set of equations, which specify the heights of the body and shoulder segments, respectively:

$$hb = wb \cdot gb$$

$$(y1-y0)-(hf+hb)=(wbs-wb)\cdot gs$$

yielding:

$$wb = \frac{y1 - y0 - hf - wbs \cdot gs}{gb - gs}$$

$$ws = wbs - wb$$

The shoulder height is then:

$$hs = ws \cdot gs$$

The preferable settings of predefined parameters with this second embodiment are the same as with the first embodiment.

Figure 11:
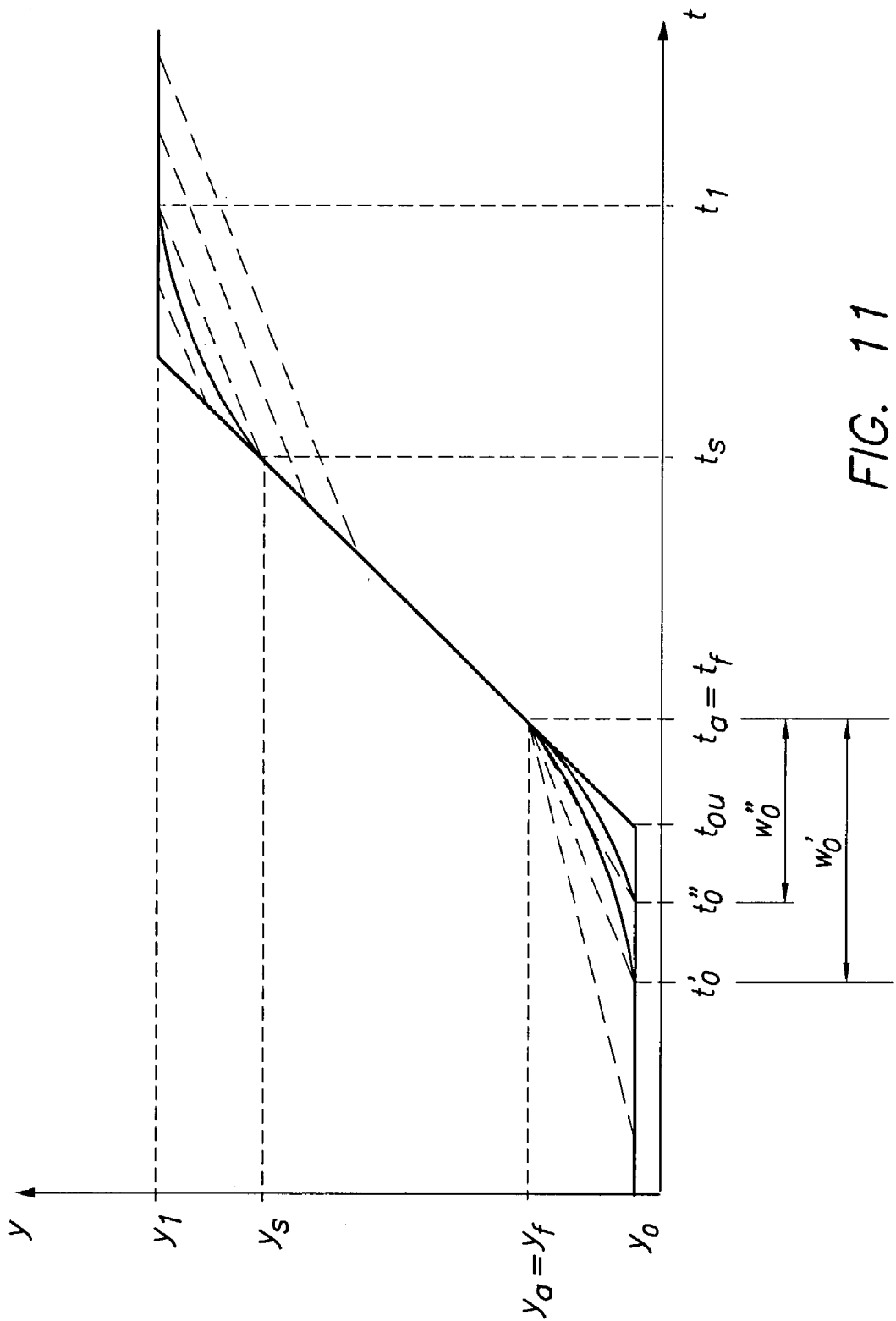
FIG. 11 illustrates the evolution of the gradation curve with varying subrange (second embodiment)

The foot segment evolves as follows with varying lower subrange width [t0, ta]. It has a predefined height hf=ya−y0, hence its average slope will decrease with increasing lower subrange width. The slopes at both subrange bounds g0 and gb are predefined, which ensures a smooth transition. However, the narrower the foot width, the steeper the evolution will be. This is shown if FIG. 11.

The evolution of the upper body segment and shoulder is similar to the first embodiment.

Figure 12:
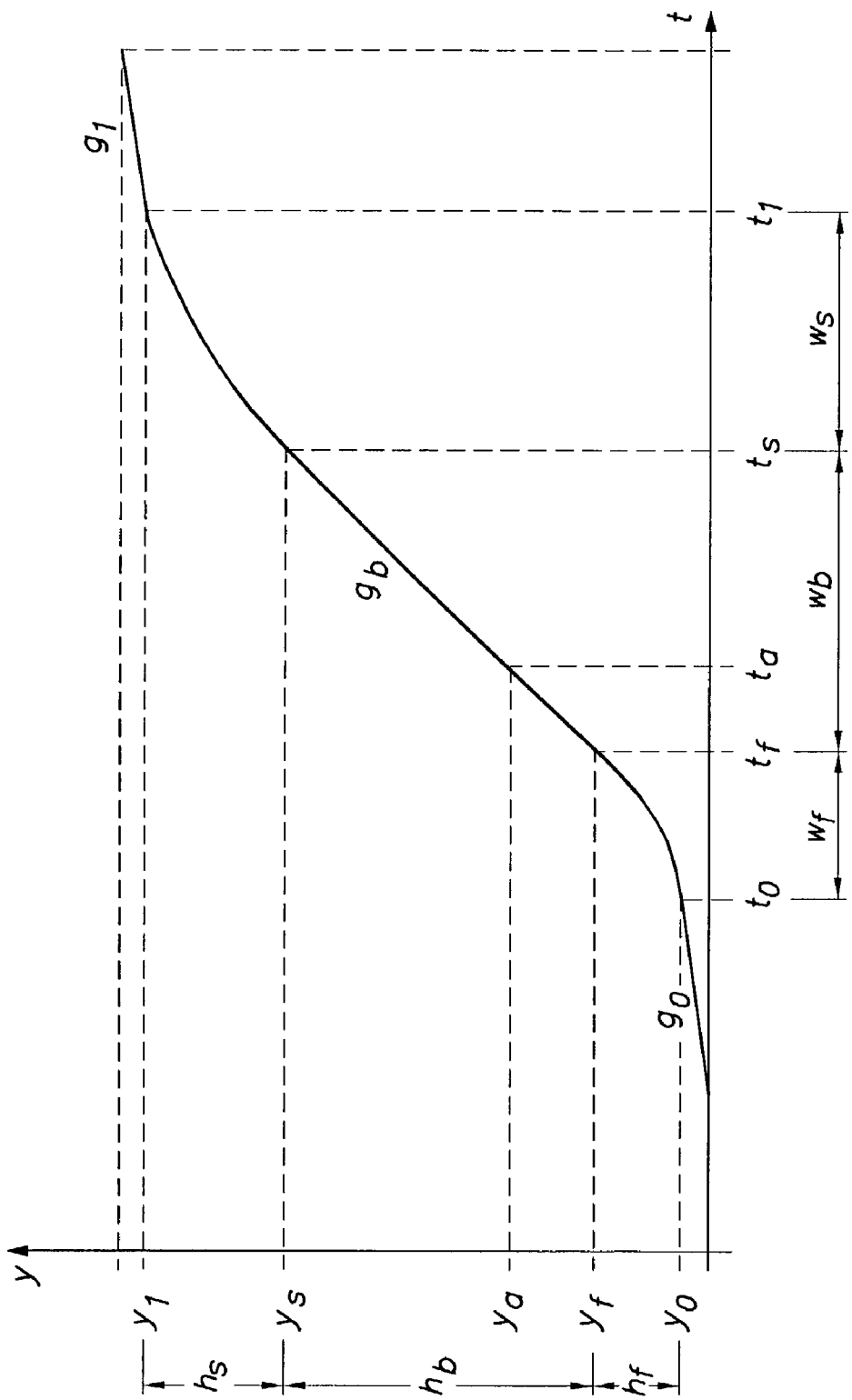
FIG. 12 illustrates a gradation curve with linear extensions (third embodiment).

In a third or fourth embodiment, the gradation curve as defined in the first or second embodiment, respectively, is extended by linear segments left from to and right from t1, as depicted in FIG. 12. These marginal segments having slopes g0 and g1 respectively, provide that any valuable pixel values that might fall outside the subrange [t0,t1] due to inaccurate determination of the subrange bounds, are still converted into output pixel values with non-zero contrast. The slopes g0 and g1 are equal to the initial foot slope and final shoulder slope, respectively.

In state of the art gradation methods, such pixels that fall outside the specified subrange are set to a constant low or high pixel value, whereby all image information beyond this range is definitively lost.

According to the present gradation method, the output image is made available for a display workstation together with its accompanying subrange parameters [y0, y1]. Most state of the art display systems e.g. the ones that are DICOM-compliant are able to understand and use the accompanying subrange bounds. In default mode, the display system selects the indicated subrange [y0, y1] from the received image data, and maps this subrange onto its entire display range. In this mode, the selected subrange is displayed in the most optimal way, and all pixels values beyond the indicated subrange are clipped to either white or black. If one is interested however to see pixel value differences outside the selected subrange, then this is made possible by interactively enlarging or the shifting the selected subrange, so that the pixel values of interest move into the new subrange.

The predefined position of the default output subrange [y0 y1] that corresponds to the selected input range [t0, t1] is preferably such that it provides some margin for both gradation curve extensions.

For example, in case of a 12 bit output image, the default output range is preferably defined as the range [y0=512, y1=3583], so that is each margin spans ⅛ of the total output range. The corresponding window width is 75%, and the window centre is 50%.

In a preferred embodiment, the gradation processing is applied to the result image of multiscale reconstruction which is the last stage in the enhancement methods described above. The latter image will be further called the enhanced image.

The composite gradation curve is generated as described above based on predefined parameters, and on three parameters t0, t1, and ta, which depend on intrinsic image characteristics. The position of the anchor point ta and the subrange bounds t0 and t1 are determined based on a figure of merit. The latter is derived from the enhanced image, i.e. the image to which gradation is to be applied.

To this end, a first grey value histogram is computed of the enhanced image, and a second histogram of the same image, the second histogram being restricted to those pixels that are flagged as relevant in a binary mask image, that has the same dimensions as the enhanced image. The second histogram represents the relative density of grey values in the enhanced image, restricted to the relevant pixel regions.

The figure of merit $fom_j$ is determined for each grey value j within the range of the enhanced image, as follows:

$$fom_j = \frac{hr_j \cdot hu_j^{-qm}}{\max_j (hr_j \cdot hu_j^{-qm})}$$

in which $hu_j$ and $hr_j$ represent the bin value counts of the unrestricted and restricted histograms, respectively, and in which the maximum is taken across the whole range of grey values.

Each restricted histogram count is balanced by the corresponding count in the unrestricted histogram, raised to a predefined exponent qm. This exponent is set to a value smaller than one, in order to limit the correction. The rationale behind this correction is the consideration that the relevance of a grey value does not only depend on how many times this value is found in the image, but at the same time, on the rate at which pixels having this value also belong to an image region that is considered relevant, as specified by the binary mask. The greater the ratio of relevant versus irrelevant pixels that have a specific grey value, the greater the figure of merit for that grey value will be.

The exponent qm is preferably set to a value in the range [0,1], most preferably 0.25. In the extreme case where qm is set to zero, there is no correction. In the other extreme case where qm equals one, the ratio of relevant to irrelevant pixels entirely determines the figure of merit. The figure of merit is in the range [0,1], 1 indicating highest relevance.

In this embodiment the lower subrange bound t0 is determined as the pixel value j for which the figure of merit fomj exceeds a predefined threshold Tf0, starting from the lowest grey value. Similarly, the upper subrange bound t1 is determined as the pixel value j for which fomj exceeds a predefined threshold Tf1, starting from the maximum grey value, and proceeding downwards.

The anchor point ta is determined as follows. Starting from the figure of merit maximum, i.e. the grey value jm for which fomj=1 the grey value index j is decremented until fomj<Tfa, the latter representing a predefined threshold. The index at threshold crossing specifies the anchor point.

The thresholds for the sub-range bounds are preferably very small, in order to minimise the risk of excluding relevant grey data from the selected sub-range, e.g. Tf0=0.01 and Tf1=0.01. The threshold for the anchor point is preferably in the range [0.1, 0.5], most preferably 0.35.

The binary mask image that flags the relevant image pixels is needed for determining the restricted grey value histogram. In a first preferred embodiment, the binary mask image is derived from a local CNR image. The dimensions of the mask image has to be adjusted to the dimensions of the local CNR image, which preferably has dimensions that corresponds with the fourth scale of the multiscale representation, as described above. The mask pixels are set to binary TRUE if the corresponding CNR pixel has a local CNR value in the range $[T_{c0}, T_{c1}]$. Hence the pixel values that have low contrast-to-noise ratio, e.g. pixels in a very homogeneous image area which commonly do not represent relevant information are excluded from the binary mask.

On the other hand, pixels with a very large contrast-to-noise ratio are likewise excluded because they correspond with very strong edges that are commonly found in image regions having a more extreme density. The preferred threshold values are $T_{c0}=2$, $T_{c1}=10$.

In a next step, the mask image is enhanced by applying a cascade of morphological filters to it, corresponding to an opening filter, followed by a closing. The opening filter first eliminates small isolated patches of TRUE pixels in the mask image, and the subsequent closing filter eliminates the holes in the mask. The disk radius of the structuring elements of the morphological filters is preferably between one and three.

In a second preferred embodiment also based on the local CNR image, each pixel of the binary mask image is marked as TRUE if its local CNR exceeds a predefined threshold $T_{d0}$, and an additional score also exceeds a threshold $T_{sc}$.

Figure 13:
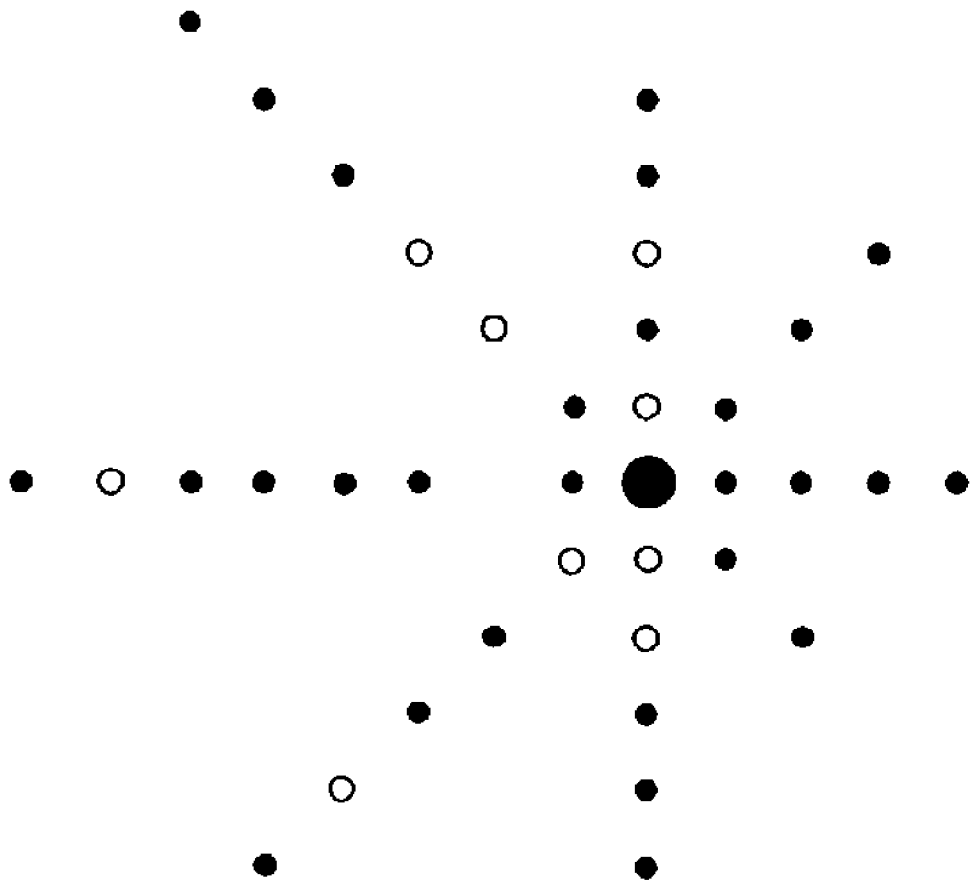
FIG. 13 depicts a neigbourhood for scoring a central pixel as part of a selection criterion used in generating a binary mask image of relevant pixels.

The score associated with a pixel is computed by tracing radial paths in eight directions starting from the considered pixel, as depicted in FIG. 13. The score is initialised to zero. During each path traversal, the score is incremented if the local CNR of the current pixel in the path exceeds a threshold $T_{d1}$. Each path traversal is terminated at the pixel in which the local CNR exceeds a threshold $T_{d2}$, or if the radius exceeds a threshold $T_{dr}$.

The CNR threshold $T_{d0}$ used as part of the selection criterion for the central pixel is less severe than the threshold $T_{c0}$ used in the first embodiment, e.g. preferably it is 1.0. As a consequence of taking a smaller threshold, more pixels will be taken into account initially. Further rejection is based on the second criterion, which is based on the number of surrounding pixels within a limited radius that have a CNR that exceed the threshold $T_{d1}$, which is preferably greater than the threshold for the central pixel, e.g. $T_{d1}=1.8$.

The required total count of super-threshold neighbouring pixels is specified by the score threshold $T_{sc}$, preferably set to 50. With this setting, in a neighbourhood comprising exclusively super-threshold pixels, a path radius of at least 7 will be required in order to yield a successful score. In practice, the supporting neighbourhood is allowed to have 'holes' of sub-threshold pixels, or it may be asymmetric if the central pixel is close to an edge. Therefore, the upper limit for the path radius is specified much larger, preferably $T_{dr}$ is greater than 20, most preferably 30.

The method in accordance with the present invention aims at flagging only those pixels belonging to coherent regions, in which the local CNR does not very too much. In that perspective, the additional terminating criterion that stops path traversal if the local CNR exceeds the threshold $T_{d2}$, avoids extending the flagged region across strong edges. The preferred setting for $T_{d2}$ is 4.5.

The invention claimed is:

1. A method of reducing noise in an image by processing a digital signal representation of said image, said processing comprising the steps of:
   decomposing said digital signal representation into at least two detail images representing detail at successive scales;
   modulating pixels of at least some of said detail images by applying modulating coefficients to said pixels so as to generate modified detail images, wherein said modulation is an attenuation of pixel values if a local contrast-to-noise ratio is smaller than a predefined critical contrast-to-noise ratio and wherein no modulation is applied if the local contrast-to-noise-ratio is equal to or greater than said predefined critical contrast-to-noise ratio; and
   computing a processed digital signal representation by applying a reconstruction algorithm to the modified detail images, wherein said modulating coefficients are deduced from a single contrast-to-noise ratio image which represents the local contrast-to-noise ratio in each pixel at a predefined one of said scales.

2. A method according to claim 1 wherein the amount of said attenuation decreases from smaller to larger scales to reach a value equal to one at a predefined scale.

3. A method according to claim 1 wherein modulation at a specific scale is obtained by pixel-wise multiplication of an attenuation coefficient matrix with corresponding pixels of the detail image at said scale, said attenuation coefficient matrix comprising attenuation coefficients and having identical dimensions as the detail image at said scale.

4. A computer readable medium storing a computer executable program code configured to carry out the steps of claim 1.

5. A method according to claim 1 wherein said predefined scale is lower than scales at which the detail images are modified.

6. A method of reducing noise in an image by processing a digital signal representation of said image, said processing comprising the steps of:

decomposing said digital signal representation into at least two detail images representing detail at successive scales;

modulating pixels of at least some of said detail images by applying modulating coefficients to said pixels so as to generate modified detail images, wherein the modulation is an attenuation of pixel values if a local contrast-to-noise ratio is smaller than a predefined critical contrast-to-noise ratio and said modulation is an amplification of pixel values if the local contrast-to-noise ratio is greater than said predefined contrast-to-noise ratio and wherein no modulation is applied if the local contrast-to-noise ratio is equal to said predefined critical contrast-to-noise ratio; and computing a processed digital signal representation by applying a reconstruction algorithm to the modified detail images, wherein said modulating coefficients are deduced from a single contrast-to-noise ratio image which represents the local contrast-to-noise ratio in each pixel at a predefined one of said scales.

7. A method according to claim 6 wherein the amount of said attenuation or amplification decreases from smaller to larger scales to reach a value equal to one at a predefined scale.

8. A method according to claim 6 wherein modulation at a specific scale is obtained by pixel-wise multiplication of an attenuation coefficient matrix with corresponding pixels of the detail image at said scale, said attenuation coefficient matrix comprising attenuation coefficients and having identical dimensions as the detail image at said scale.

9. A computer readable medium storing a computer executable program code adapted to carry out the steps of claim 6.

10. A method of reducing noise in an image by processing a digital signal representation of said image, said processing comprising the steps of:

decomposing said digital signal representation into at least two detail images representing detail at successive scales;

modulating pixels of at least some of said detail images by applying modulating coefficients to said pixels so as to generate modified detail images, wherein the modulation attains a fixed minimum value if a local contrast-to-noise ratio value is smaller than a predefined contrast-to-noise ratio value; and computing a processed digital signal representation by applying a reconstruction algorithm to the modified detail images, wherein said modulating coefficients are deduced from a single contrast-to-noise ratio image which represents the local contrast-to-noise ratio in each pixel at a predefined one of said scales.

11. A method according to claim 10 wherein modulation at a specific scale is obtained by pixel-wise multiplication of an attenuation coefficient matrix with corresponding pixels of the detail image at said scale, said attenuation coefficient matrix comprising attenuation coefficients and having identical dimensions as the detail image at said scale.

12. A computer readable medium storing a computer executable program code adapted to carry out the steps of claim 10.

13. A method of reducing noise in an image by processing a digital signal representation of said image, said processing comprising the steps of:

decomposing said digital signal representation into at least two detail images representing detail at successive scales;

modulating pixels of at least some of said detail images by applying modulating coefficients to said pixels so as to generate modified detail images, wherein the modulation attains a fixed maximum value if a contrast-to-noise ratio exceeds a predefined contrast-to-noise ratio; and computing a processed digital signal representation by applying a reconstruction algorithm to the modified detail images, wherein said modulating coefficients are deduced from a single contrast-to-noise ratio image which represents the local contrast-to-noise ratio in each pixel at a predefined one of said scales.

14. A method according to claim 13 wherein modulation at a specific scale is obtained by pixel-wise multiplication of an attenuation coefficient matrix with corresponding pixels of the detail image at said scale, said attenuation coefficient matrix comprising attenuation coefficients and having identical dimensions as the detail image at said scale.

15. A computer readable medium storing a computer executable program code configured to carry out the steps of claim 13.

* * * * *

UNITED STATES PATENT AND TRADEMARK OFFICE
CERTIFICATE OF CORRECTION

PATENT NO. : 7,167,598 B2 Page 1 of 1
APPLICATION NO. : 10/331207
DATED : January 23, 2007
INVENTOR(S) : Pieter Vuylsteke It is certified that error appears in the above-identified patent and that said Letters Patent is hereby corrected as shown below:

In claim 9, column 27, line 32, delete "adapted" and insert --configured--.

In claim 12, column 28, line 14, delete "adapted" and insert --configured--.

Signed and Sealed this

Thirtieth Day of October, 2007

JON W. DUDAS
*Director of the United States Patent and Trademark Office*